| | |
|---|---|
| FIG. 2 | FIG. 7 |
| FIG. 3 | FIG. 8 |
| FIG. 4 | FIG. 9 |
| FIG. 5 | FIG. 10 |
| FIG. 6 | FIG. 11 |
| | FIG. 12 |
| | FIG. 13 |
| | FIG. 14 |

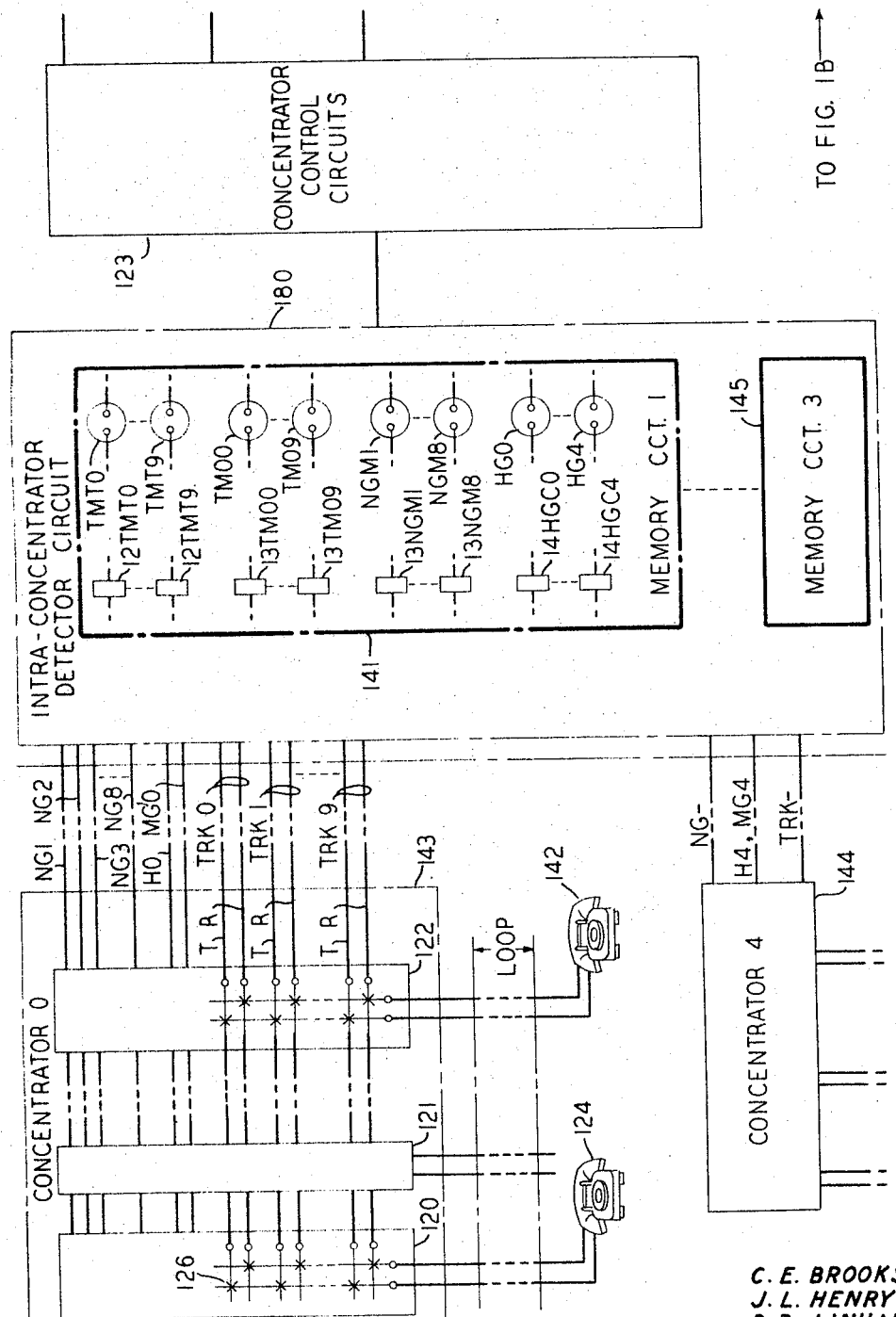
FIG. IA
INVENTORS
C. E. BROOKS
J. L. HENRY
P. B. LINHART
G. E. MARKTHALER
D. R. MASSONI
J. A. MEYERLE
BY S E Hollander
ATTORNEY

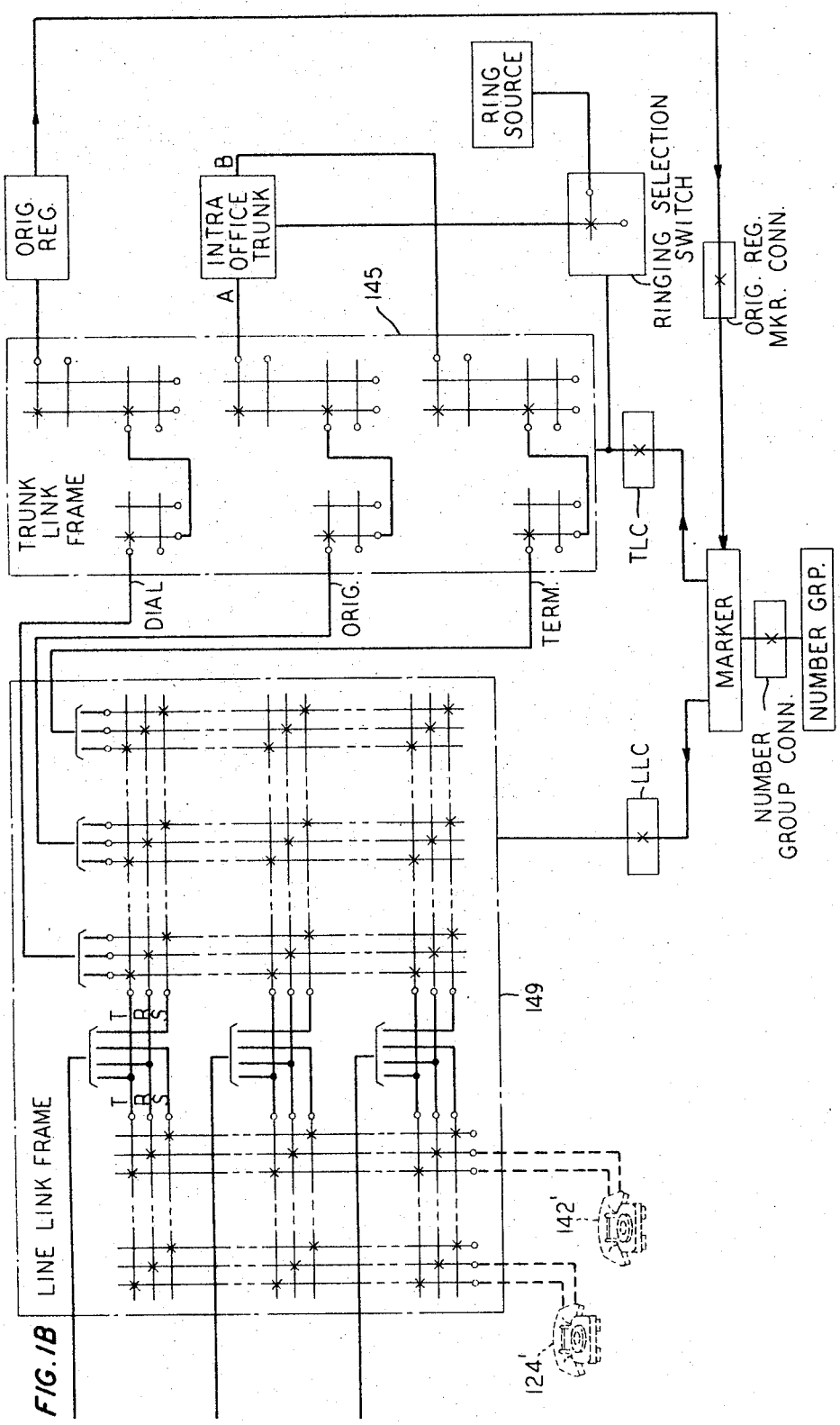

United States Patent Office

3,462,557
Patented Aug. 19, 1969

3,462,557
INTRA-CONCENTRATOR CALL DETECTING CIRCUIT
Chester E. Brooks, Montvale, and James L. Henry, Madison, N.J., Peter B. Linhart and Grace E. Markthaler, New York, and Donald R. Massoni, East Rockaway, N.Y., and John A. Meyerle, Manasquan, N.J., assignors to Bell Telephone Laboratories, Incorporated, New York, N.Y., a corporation of New York
Filed Dec. 27, 1965, Ser. No. 516,314
Int. Cl. H04m 3/02
U.S. Cl. 179—18                                  24 Claims

ABSTRACT OF THE DISCLOSURE

Equipment is disclosed for controlling the establishment of intra-concentrator call connections over a single trunk connected between a central office and a remote switching facility. A detection circuit including a memory is activated each time central office equipment completes a call connection between two remote substations (1) for determining whether those substations are connected to trunks serving a common remote switching facility and (2) for verifying that an intra-concentrator call connection is in progress. When both conditions are satisfied, one of two trunks employed initially to establish such connection is released and an intra-concentrator connection is completed over a single trunk between the substations.

---

This invention relates to telephone concentrator switching systems and more particularly to a method and arrangement for providing intra-concentrator connections between two substations coupled to the same concentrator terminal.

As is well known, a line concentrator provides facilities for extending customer substations over a relatively smaller number of trunks to a central office. In accordance with an improved type of concentrator arrangement, as described in Patent 3,198,887 of C. E. Brooks et al. of Aug. 3, 1965, a relatively larger number of substations may be coupled over a smaller number of trunks to a central office through the use of "distributed" remote switching facilities proximate to the respective customer substations. The remote switching units provide access from the respective customer substation to the group of trunks extending to the office over which connections may be further extended to distant substations or to other substations coupled to the same concentrator. In part, this procedure is effected through the use of control conductors or number group conductors which are coupled to the respective substation remote units in accordance with a predetermined code uniquely indicative of the customer substation. Reference may be made to the above-referred-to patent for a detailed exposition of the operation of a distributed line concentrator of this type.

It has been empirically established that, in the case of at least certain concentrator installations, (for example, in suburbs or rural areas) a substantial percentage of the calls initiated are intra-concentrator calls, i.e., calls in which the originating substation and terminating substation are coupled to the same group of speech trunks and control or number group conductors. The problem which is posed by intra-concentrator calls is the degree to which an overall service degradation is experienced by the remaining customer substations coupled to the same concentrator.

For example, it is not unusual for a concentration ratio of five to one, or fifty lines to ten trunks to be used. If an intra-concentrator call is established between two customers coupled to the same concentrator 20 percent of the overall trunk capacity will be dissipated in processing a single call. The difficulties inherent in such an arrangement are, of course, aggravated in the event that a plurality of intro-concentrator calls are in progress, It is apparent that five intra-concentrator calls will result in the denial of further conventional telephone service and access to the telephone office to the remaining 40 customers coupled to the concentrator.

Certain prior art facilities, in an attempt to cope with this problem, have resulted in arrangements such as that disclosed in the above-referred-to patent for realigning the connection between two customers coupled to the same concentrator by releasing one of the two trunks customarily used connecting both customers to a single speech trunk.

Although completely operative and useful, such an arrangement dictates the necessity, in the event of an intraconcentrator call for marking one of the trunks which may possibly be involved on an intra-concentrator call with a unique identifying tone. Since it is uncertain if an intraconcentrator call is in progress, "blind" scanning of all the remaining trunks in the concentrator for the existence of such tone is required. If the tone is detected on another trunk, it is assumed that an intra-concentrator call is in progress and both substations may be connected to the same trunk whereupon the remaining trunk may be released.

It is, therefore, an object of this invention to provide intra-concentrator detecting facilities, effective for identifying those trunks interconnected in an intra-concentrator call.

Still another object of this invention is to detect interconnected trunks on an intra-concentrator call without the necessity for scanning all of the trunks in a concentrator group.

These and other objects and features of this invention are achieved in one specific illustrative embodiment in which an erasable memory circuit is utilized in conjunction with an intra-concentrator detecting circuit.

As used, for example, in conjunction with the No. 5 crossbar telephone switching system, a gas tube memory circuit will record the advent of each "forward-linkage" connection or terminating connection by registering the identity of the horizontal group to which the called line is connected and the identity of the trunk utilized in the terminating portion of the call. For an explanation of the conventional operation of a No. 5 crossbar telephone switching system, reference may be made to Patent 2,585,904 of A. J. Busch of Feb. 19, 1952.

Following the forward-linkage or terminating portion of the call, conventional operation dictates a "call-back" connection or establishment of the originating portion of the connection (on an intraoffice call). The memory facility is adpated to store the terminating information, as indicated above, and if a call-back connection is effected within a predtermined interval, for example, 750 milliseconds, the data respecting the concentrator identity or number group code identity of the (originating) customer substation involved in the call-back call as well as the identity of the trunk utilized and the horizontal group identity are stored.

Arrangements are provided if a call-back call is not initiated within the predetermined interval following the storage in memory of information respecting a terminating or forward-linkage call to erase the information priorly stored in the memory.

If, however, a call-back call is initiated within the predetermined interval, the information appertaining thereto is stored in the register in conjunction with the priorly stored forward-linkage information.

Under these conditions, the horizontal group identity stored in the memory circuit is compared with the horizontal group identity stored during the forward-linkage portion of the call. If a match exists, the call may be an intra-concentrator call. (All lines terminated on the same concentrator are coupled to the same horizontal group.) If no match exists, the call-back portion of the call is determined to have been associated with a concentrator distinct from that used on the forward-linkage portion of the call and the information priorly stored respecting the forward linkage is erased.

In the case of a match of the horizontal group identities, the verification that an intra-concentrator call does exist is effected by the application of a coded signal to the trunk utilized on the call-back linkage portion of the call, while the trunk utilized for the forward-linkage portion of the call has a detector coupled thereto.

It is significant to note at this juncture that the detection takes place on only that trunk involved in the forward-linkage connection, rather than "blindly" scanning all of the remaining trunks.

If the coded signal applied to the trunk utilized on the call-back-linkage is not detected on the trunk over which the forward-linkage call has been effected, a "not-identified" condition is indicated and the memory circuits are released. If, however, the detector coupled to the forward-linkage trunk is actuated, the existence of an intra-concentrator connection is verified. Thereafter, the conventional ringing and answer conditions on the terminating or forward-linkage trunk are awaited and, after the answer condition occurs, a disconnect procedure is instituted on the trunk utilized for the call-back portion of the call. The identity of the call-back trunk is derived from the memory circuit and the customer priorly coupled thereto, whose identity is also stored in the memory circuit, is transferred to the trunk utilized on the terminating portion of the call. The identity of the latter trunk is also stored in the memory circuit. Thereafter, the memory circuits are released and the system is free to process additional calls.

These and other objects and features of the invention may be more readily apprehended from examination of the following specification, appended claims and attached drawing in which:

FIGS. 1A and 1B show a block diagram of a specific illustrative embodiment of the invention in combination with a line concentrator and telephone switching system;

FIGS. 2–14 show portions of the control circuitry and the details of the intra-concentrator detector circuit of FIG. 1;

FIG. 2 shows a portion of the remote switching units and the trunks extending to the central office;

Figure 2:
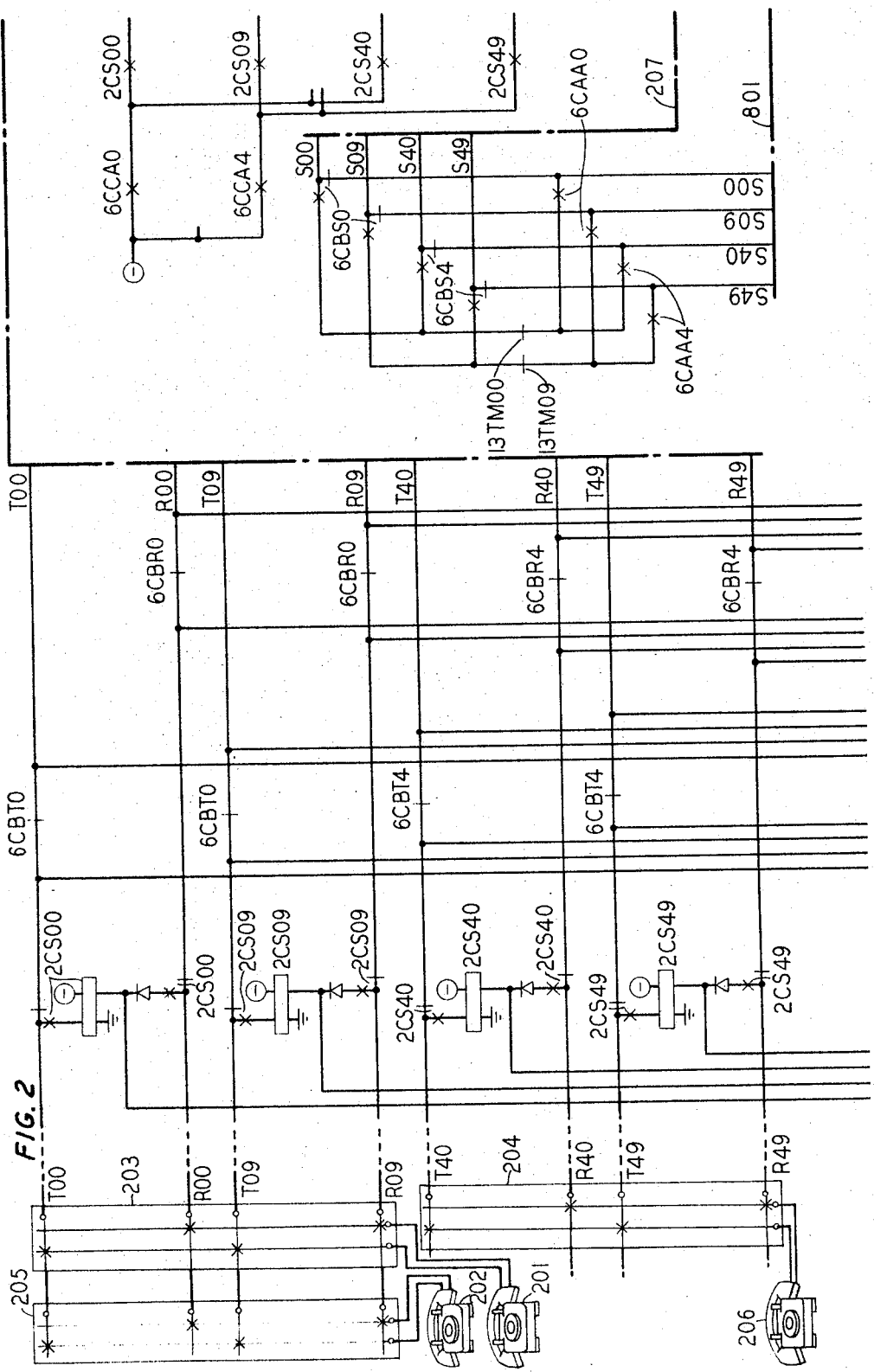
Figure 3:
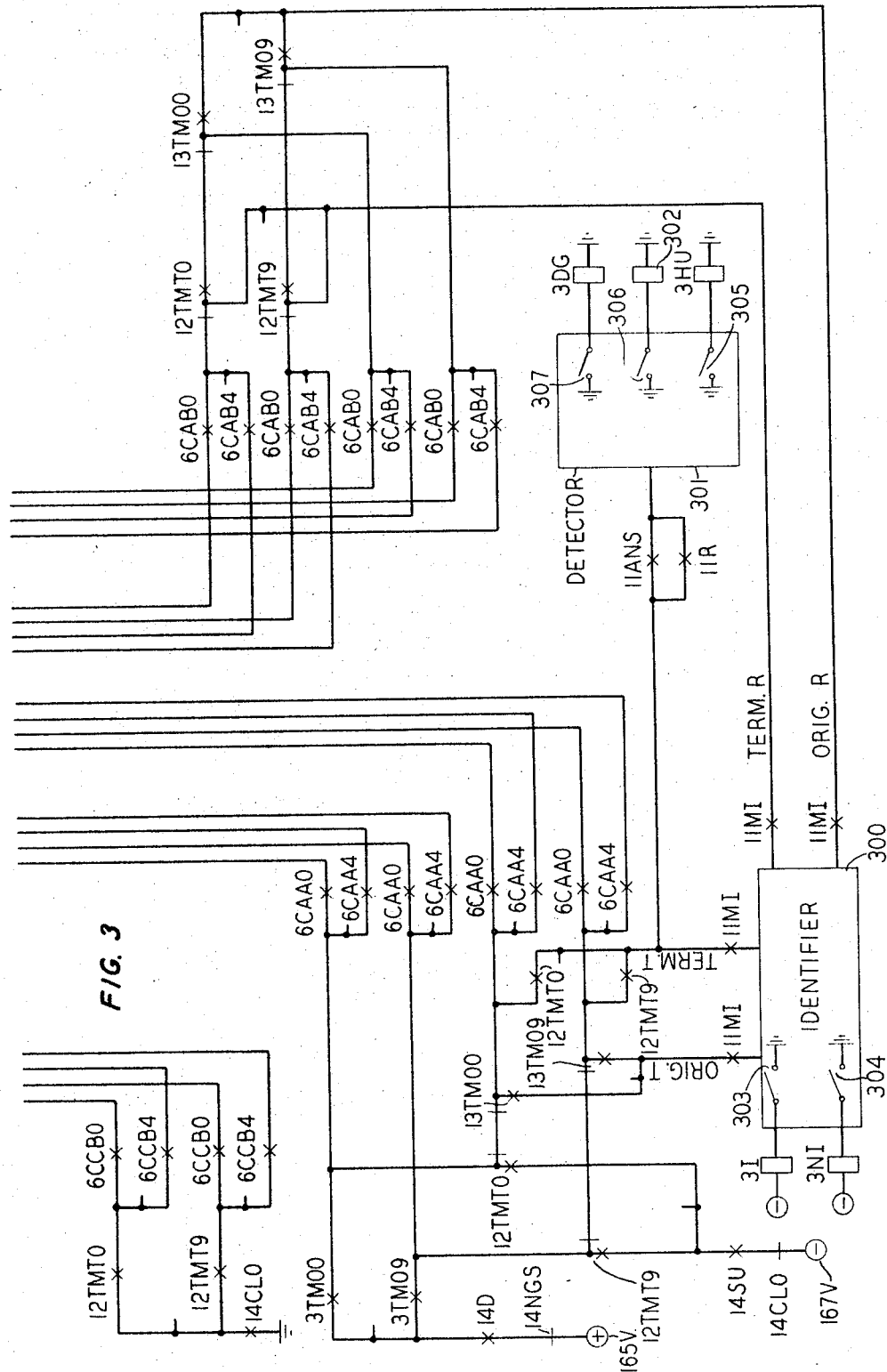
Figure 5:
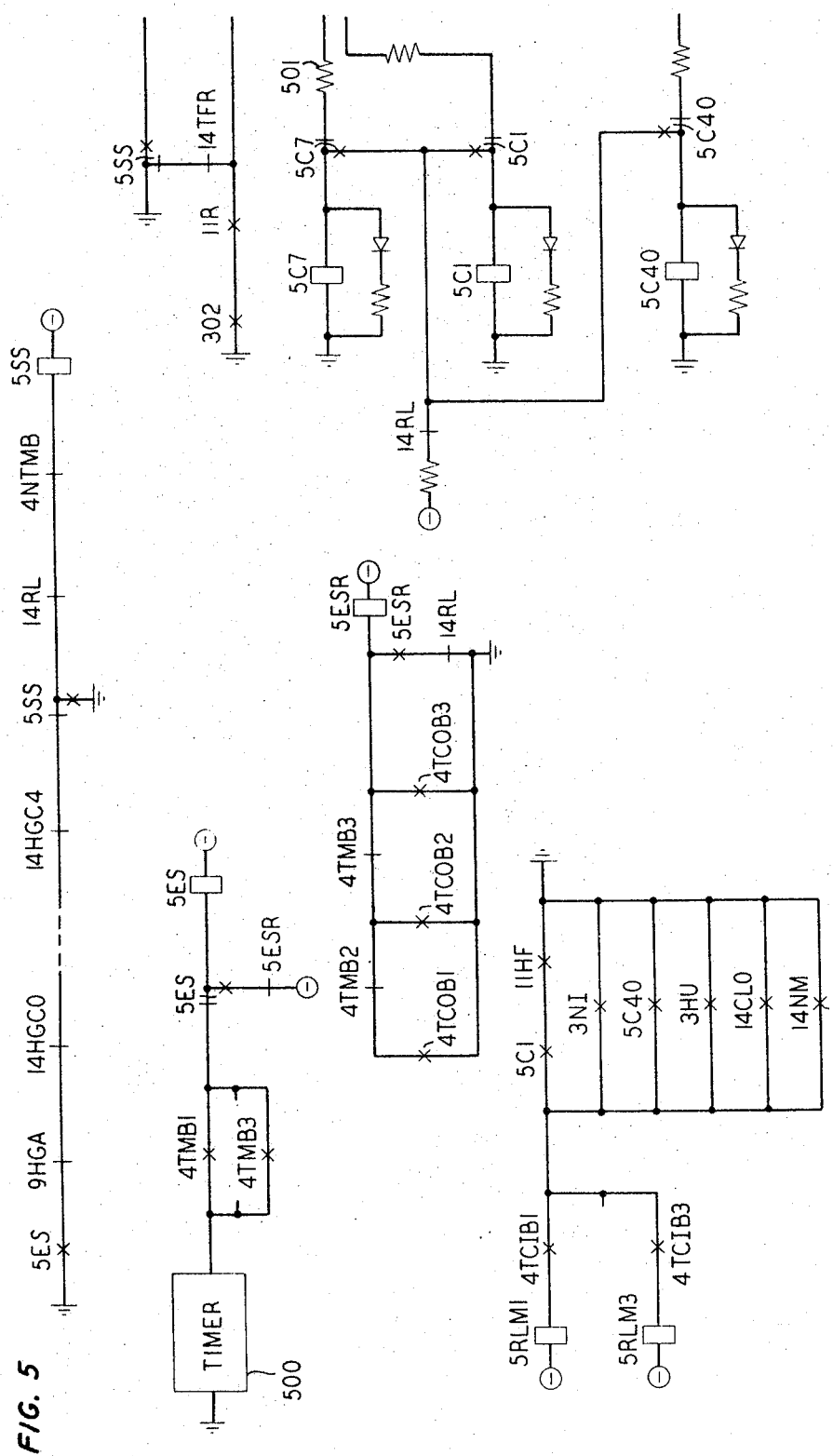
Figure 6:
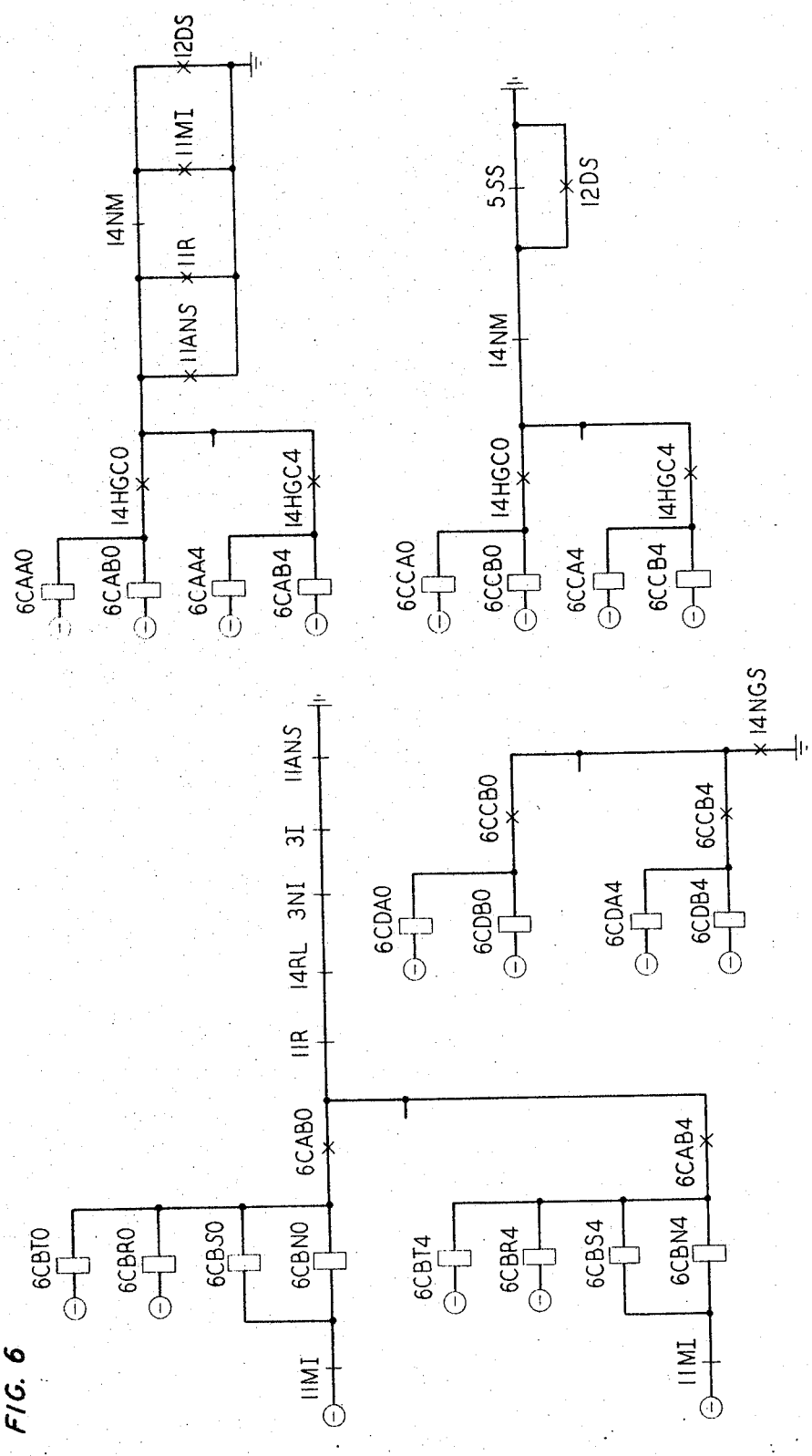
Figure 7:
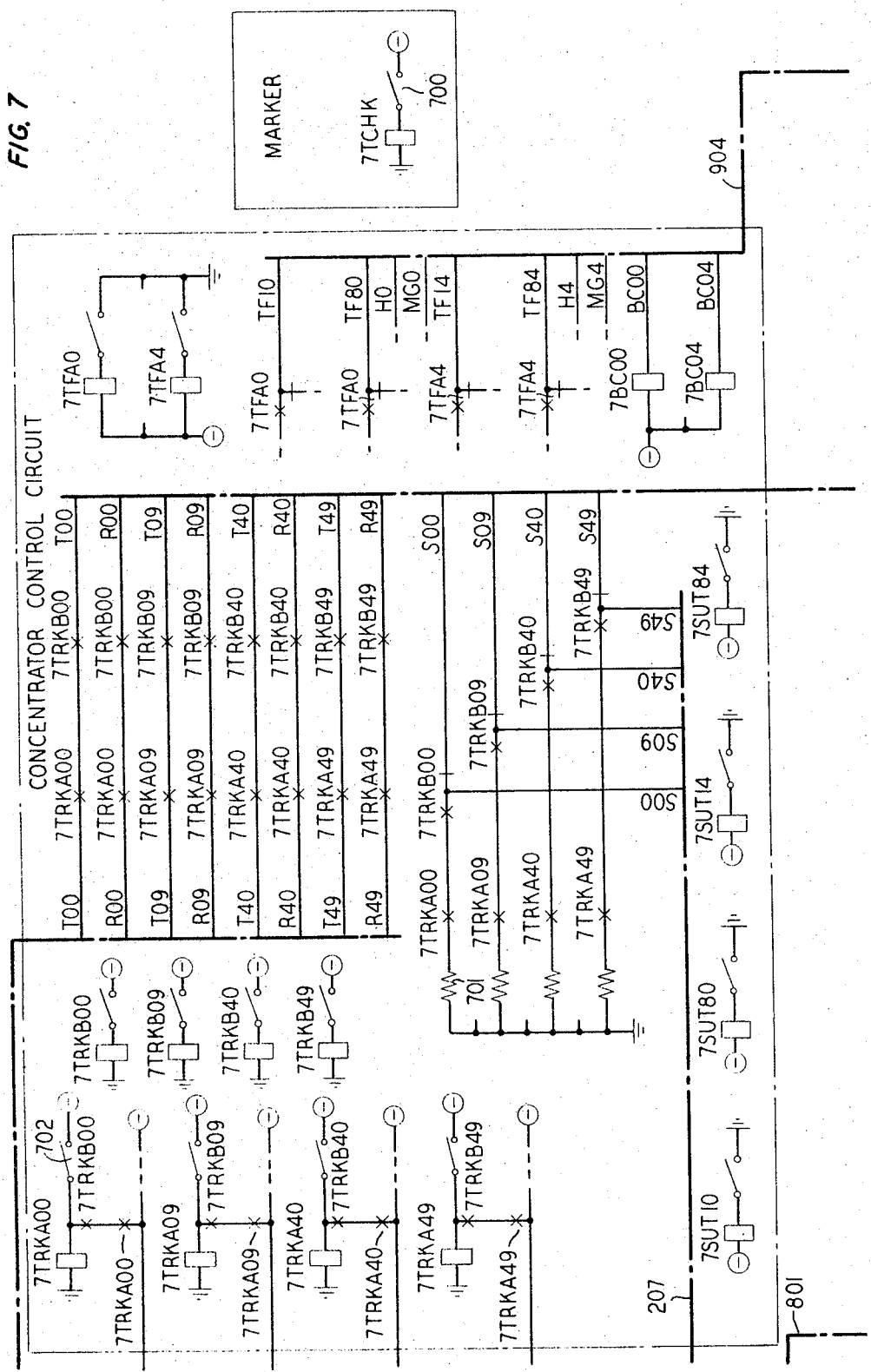
Figure 8:
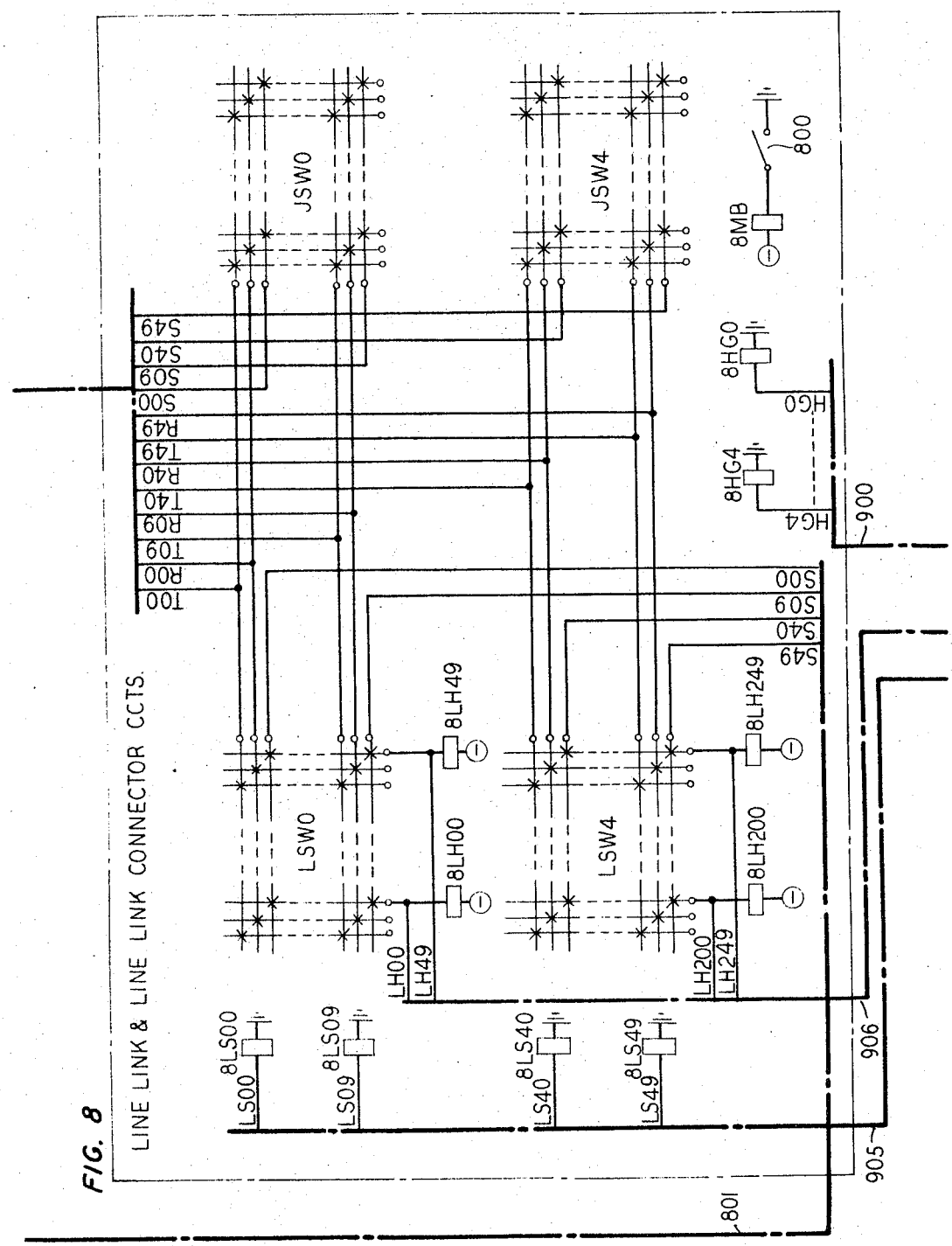
Figure 9:
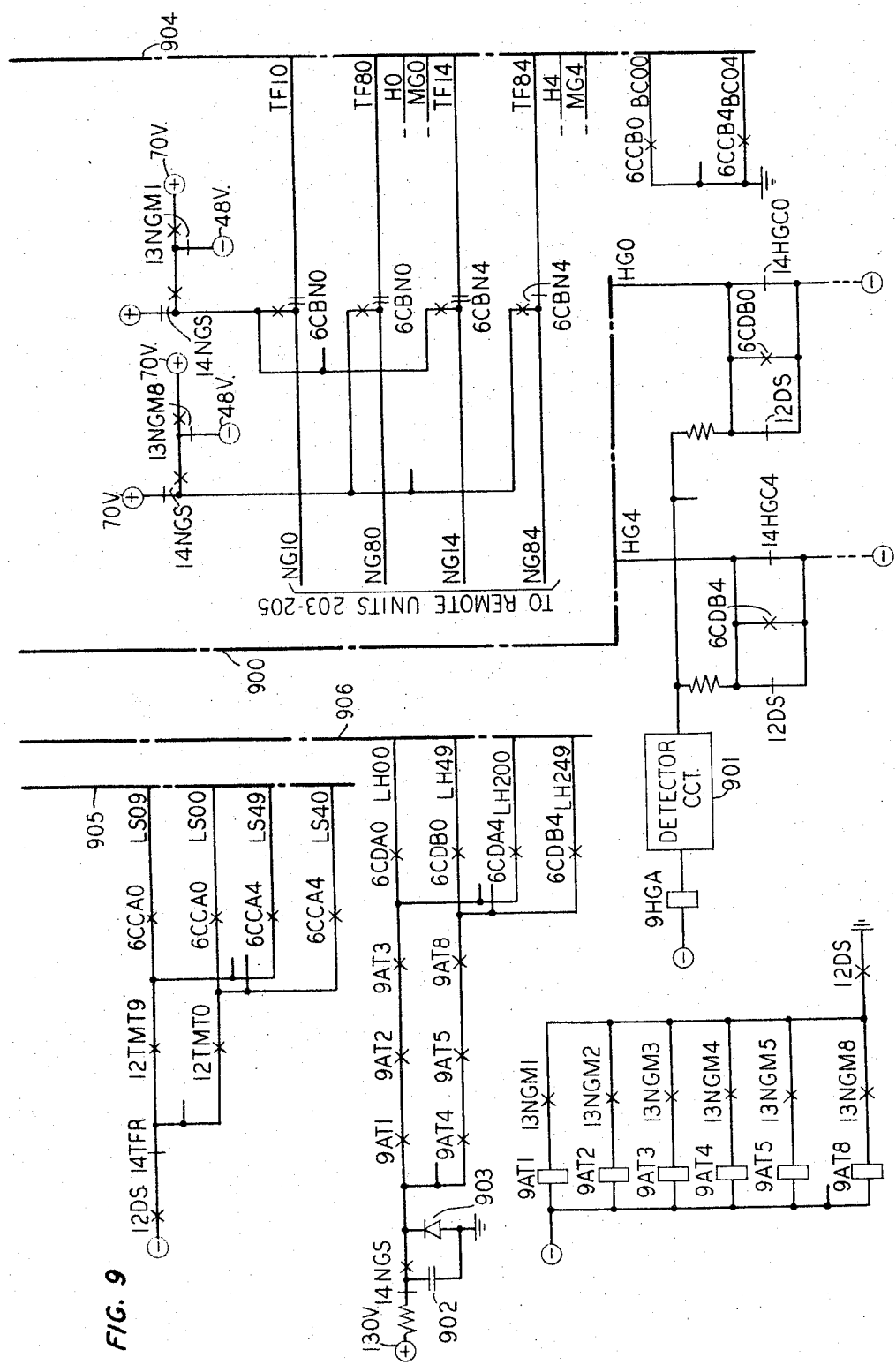
Figure 10:
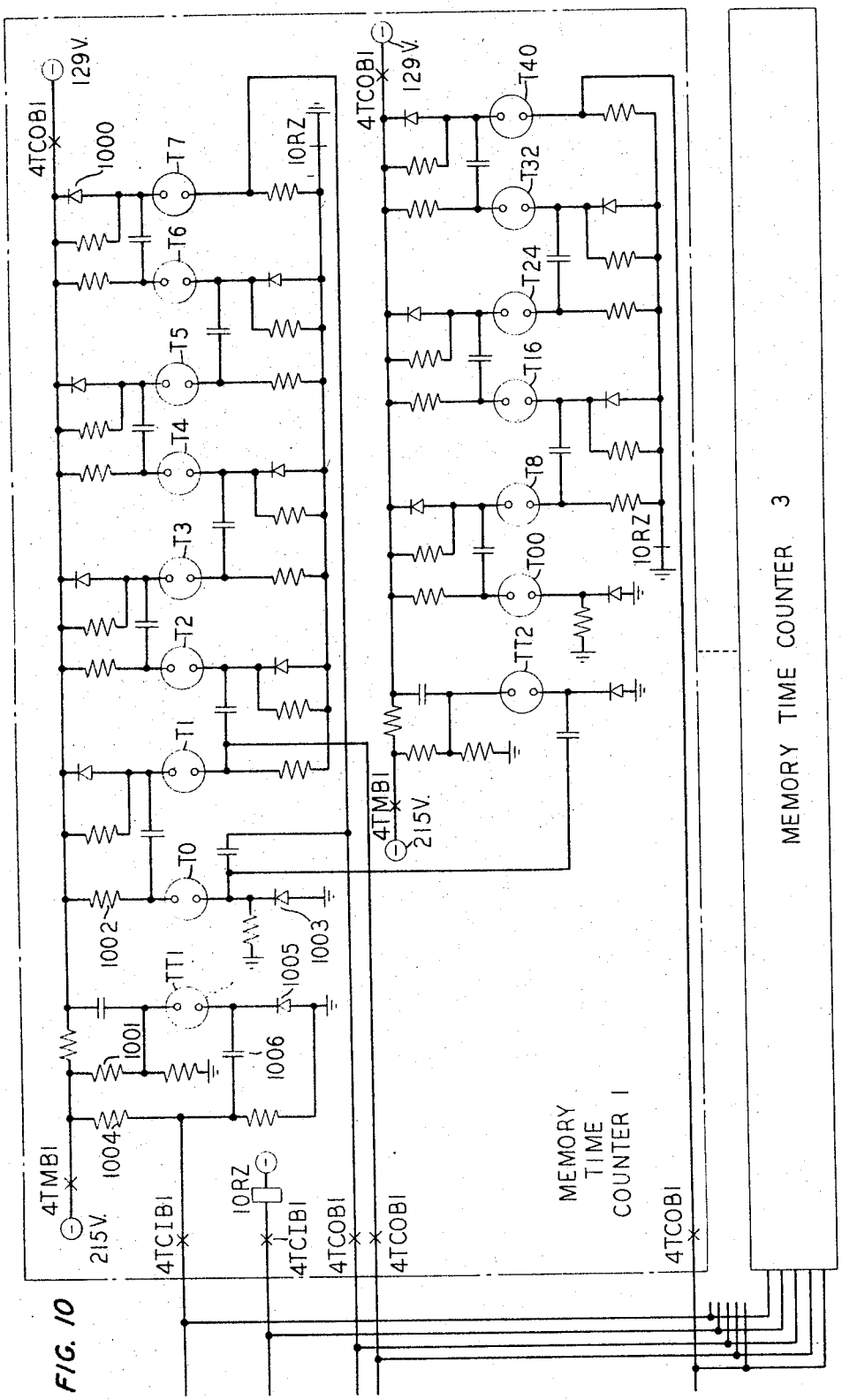

FIG. 3 includes the marking signal facilities and detecting facilities for verifying intra-concentrator connections;

FIG. 4 includes facilities for governing the scanning of the several memory circuits;

FIG. 5 and 6 show additional details of the control circuitry for the intra-concentrator detector circuit;

FIG. 7 shows portions of the details of the concentrator control circuit of FIG. 1;

FIG. 8 shows portions of the details of the line link frame of FIG. 1;

FIG. 9 includes facilities for marking the number group conductors preparatory to transfer of calling and called customers to the same trunk;

FIG. 10 shows the time counter for the memory circuits of FIGS. 11–14;

FIGS. 11–14 show the details of the memory including the gas tube storage elements; and FIG. 15 shows the disposition of FIGS. 2–14.

GENERAL DESCRIPTION

To facilitate comprehension of the detailed description which follows, the advantageous manner in which the distributed line concentrator is operated in combination with the No. 5 crossbar telephone system will be disclosed generally. For preservation of clarity, only those aspects of the No. 5 system essential to an understanding of the present invention are included. For a comprehensive description of the operation of the No. 5 crossbar system, reference may be made to the above-identified Busch patent.

FIGS. 1A and 1B show an outline diagram of the concentrator apparatus as combined with the No. 5 crossbar system. The line packages 120, 121 and 122 are each connected to three out of eight number group leads NG1–NG8 in accordance with a code as described in the above-referred-to Brooks et al. patent. Each of these packages is connected, moreover, to a ground or number group conductor MG and the common hold or battery lead H.

A number of speech trunks (e.g., ten) of which three are shown are connected to each of the line packages. The number group leads terminate at the central office in a control circuit 123 used for identifying substations which originate service requests and for additional control operations. It is seen from the drawing that the trunks are extended to the horizontal levels of crossbar switches in the line link frame.

Typically, 50 lines may be connected over ten trunks to the central office for each concentrator. Illustratively, five concentrators of which only 143 and 144 are shown may be serviced by an intra-concentrator detector circuit 180 having three memory circuits of which only 141 and 145 are shown. The latter are explained further herein.

In describing the operation of the invention, it will be assumed that a calling party at substation 124 connected to line package or remote unit 120 is seeking to effect a connection through the central office to a subscriber 142 conected to the same concentrator through package 122. In establishing a dial-tone connection, removing the receiver from the switchhook at substation 124 causes current to flow through particular number group leads (e.g., NG1–NG3) connected through line package 120 to substation 124 as explained in the detailed description which follows. For purposes of explanation it will be noted that the remaining substations, also as explained herein, are connected to differing combinations of the number group conductors to specifically identify those substations.

The current which flows in the number group conductors, as described above, due to the off-hook condition at substation 124 is detected in the central office in applique circuit 123. In essence, the identification of the calling substation as substation 124 results in the operation of a line relay uniquely associated with the calling line. In response to the operation of the line relay, the line link frame 149 is actuated to inform the line link marker connector (not shown) that a marker is required. The line link marker connector selects an idle marker and transmits to the marker the identity of the calling line. The marker then proceeds to determine the line links frame number and the location of the line on the frame and also whether an idle register is available and if a channel can be established between the line and the originating regiser. When the marker selects a trunk link frame 145 having an idle register connected thereto, it also selects an idle channel between the subscriber line and the originating register. Having found the idle channel, the marker operates select and hold magnets required to close through the channel to the originating register. Thereafter, the marker releases its associated connectors and itself, and the register now furnishes dial tone to the subscriber and is ready to receive the digits which are dialed. The digits which the subscriber dials are registered in the originating register and when dialing is completed, the originating register seizes a marker and transmits the registration to it.

While the description above covers the operation of a No. 5 crossbar system in general, it will be appreciated that the attempt by the marker to establish a channel between the calling substation and the originating results in the operation of control equipment in the applique circuit 123 to extend the connection out into the field and to operate the remote crosspoints in line package 120.

Thus during the course of its operation, the marker seeks to establish a connection to substation 124 which it "believes" is connected (as shown in dotted outline for substation 124') to the vertical of the crossbar switch on the line link frame. As explained in detail in the above-referred-to Brooks et al. patent, the substation line is not connected to the vertical of the switch, and instead, the horizontal of the crossbar switch is connected over a concentrator trunk into the field. In lieu of connecting the subscriber substation conveniently as shown for substation 124', the substation is connected through the crosspoints 126 of package 120 to trunk 0, for example, as shown for substation 124. Trunk 0 is extended to the horizontal channel of the crossbar switch on the line link frame. As a result, during the conventional operation described above when the marker sought to effectuate the horizontal channel to the equipment location of substation 124, equipment in the applique control circuit 123, as explained in the above-referred-to Brooks et al. patent, is energized to extend the trunk and effectuate a connection between the substation 124 and the trunk by applying a marking potential to the number group leads (e.g., NG1, NG2 and NG3) unique to that substation and simultaneously applying a marking potential to the tip conductor of the selected trunk 0. A particular crosspoint 126 is energized by the marking potential to complete the path.

TERMINATING AND "CALL-BACK" CONNECTIONS

Heretofore, it has been indicated that the originating subscriber was connected to an originating register and the identity of the calling substation was stored in the originating register. After the called directory number is dialed, the originating register in accordance with conventional practice engages a marker through an originating register marker connector. The register then transmits the line equipment location of the calling line and the directory number of the called substation to the marker. The marker, which is equipped to translate the office code, determines that the called number is in the same office (assigned to the same marker group as the calling line). The marker then proceeds to perform an intraoffice trunk connection.

As usual, No. 5 crossbar practice consists of two divisible functions: the establishment of a terminating connection, sometimes hereinafter referred to as a forward-linkage call, and the establishment of an originating connection referred to as a call-back call. The terminating portion of the connection is set up between the called line and the so-called B appearance of the intraoffice trunk as shown in FIG. 1, and the call-back portion of the connection is set up between the calling line and the A appearance of the intraoffice trunk.

The terminating connection is always established first to determine if the called line is busy, whereupon the marker may immediately connect the calling line to a busy tone trunk. Before setting up the terminating connection, the marker obtains access through the number group connector and delivers the directory digits of the called number to the number group. The number group performs its conventional function of translating these digits into an equipment location and delivers this information to the marker together with the appropriate form of ringing. During the interval that the marker is obtaining information from the number group, it also selects an idle intraoffice trunk. The marker then obtains access to the line link frame 149 on which the called subscriber substation is "terminated" (since concentrated lines are involved, all of the terminations are, of course, remote). If the called substation line is free, a terminating connection is set up between the B appearance of the intraoffice trunk on the trunk link frame and the called line through a channel and idle concentrator trunk, for example trunk 0.

Having thus established the terminating connection, the marker then proceeds to set up an originating (call-back) connection between the calling line and line link frame 149 and the A appearance of the intraoffice trunk on trunk link frame 145 over trunk 9, for example.

Thereafter the marker sets up the ringing selection switch in the terminating connection in accordance with the information obtained from the number group as discussed above, and also releases itself and the originating register from the intraoffice connection. At this time, the subscribers are interconnected and the trunk now controls the ringing and supervision of the call.

Concurrent with the above operations, apparatus in the intra-concentrator call detector 180 is energized to determine in the first instance if an intra-concentrator call exists and if so, subsequently, to disestablish the call-back connection and to connect the calling party to the same trunk to which the called party has been connected by the marker.

When the marker is engaged, as described above on the terminating portion, or forward-linkage portion, of the call, a horizontal group relay is energized by the marker. Thereafter, a path is extended for the operation of a relay and gas tube in the memory circuit indicative of the concentrator identity (e.g., concentrator 0). Also, when a trunk is selected as evidenced by the operation of the select and hold magnets in the crossbar switch, the identity of the trunk (e.g., trunk 0) is stored in a corresponding relay and gas tube of the memory circuit 180.

Thus, in response to the forward-linkage portion of the call, the memory circuit 180 will store the concentrator identity (which of the five concentrators is active) in gas tube HG0 (for concentrator 0) and the identity of the trunk utilized on the terminating, or forward-linkage, portion of the connection in tube TMT0 (for trunk 0).

When the marker completes the conventional call-back connection, as described above, the intra-concentrator circuit registers the identification of the trunk used in the call-back portion of the call and the number group code (illustratively on a three out of eight basis) of the concentrator number of the calling substation.

If, for example, the call-back trunk is trunk 9, at gas tube TM09 unique to that trunk in the memory circuit will be activated. Assuming the calling line is 00, three tubes NGM1–NGM3 (of which only NGM1 is shown) will be energized.

The horizontal group or concentrator identity of the calling line—each concentrator is connected to a distinct horizontal group—is stored in the memory circuit in a manner similar to that described for the forward-linkage, or terminating, portion of the connection.

The three information elements, viz., the concentrator identity of the calling customer, the horizontal group identity of the concentrator and the trunk identity of the call-back trunk represent the total information stored in the memory circuit respecting a call-back call.

If the horizontal group identity stored on the call-back call differs from that stored on the forward-linkage portion of the call (e.g., HG0 and HG4), an indication is rendered indicative of a "no-match" condition, since the calling and called trunks are in different concentrators.

If, however, the horizontal group identities are the same (e.g., HG0), a determination must be made if the forward-linkage and call-back information represent an actual intra-concentrator call and not a coincidental storage of information respecting two separate and unrelated calling connections. This determination is made, as shown herein in detail, by applying a unique signal condition only to the trunk utilized on the call-back call, while the signal is awaited only on the forward-linkage trunk, all as determined from the memory circuit.

If the signal is returned to the forward-linkage trunk, an indication is rendered that an actual intra-concentrator connection is in effect. Thereupon, when the conventional ringing signal is applied to the called trunk and, when an answer condition obtains, the connection of the call-back trunk to the calling customer is disestablished and the substation line of the calling customer, as well as the individual termination on the crossbar switch in the central office unique to the calling customer, are connected to the same terminating trunk to which the called customer is connected. In this manner, both customers are coupled to the same trunk and the original trunk used for the call-back connection may be exploited to serve other calls.

DETAILED DESCRIPTION OF MAJOR COMPONENTS

Referring now to FIGS. 2–14, it will be seen that a group of remote concentrator units 203–205 are shown connected to trunks T00 and R00 through T49 and R49. Illustratively, 50 trunks are utilized to connect 250 substations (of which only substations 201, 202 and 206 are shown) to the central office. The remote units 203–205 are of the distributed type referred to in the Brooks et al. patent and are individual to the respective substations 201, 202 and 206. Thus, 50 substations and the associated remote distributed switching units are connectable over trunks T00 and R00 through T09 and R09 to the central office via the control circuit of FIG. 7.

In FIG. 8, a conventional line link frame of the type disclosed in the above-referred-to Busch patent is shown. The trunks extending to the remote distributed switching units are connected to the horizontal multiples of the line link frame of FIG. 8. Thus on FIG. 8, two horizontal groups are shown, each of which may illustratively include three physical crossbar switches of the usual ten horizontal levels and 20 vertical multiples. The first 50 vertical multiples are individual to respective customer substations on the associated concentrator. The remaining ten vertical multiples are utilized for the junctor switch, e.g., switch JSW0. Thus, in FIG. 8, line switch 0 serves concentrator 0 (lines 0–49) and line switch 4 serves concentrator 4 (lines 200–249). Of the five line switches, only switches 0 and 4 are shown. Each line switch comprises a horizontal group and is devoted to a single concentrator.

Trunks T00 through T09 and R00 through R09 are unique to horizontal group 0 and concentrator 0 and the ten trunks T40 and R40 through T49 and R49 are individual to horizontal group 4 and concentrator group 4. The remaining horizontal groups and associated trunks are not shown, although it is understood that they would serve concentrators 1–3 and the associated trunks T10 and R10 through T39 and R39.

A group of memory circuits adapted to serve the five concentrators, are shown in FIGS. 11–14. Illustratively, three memory circuits are shown, although only the detailed circuitry for memory circuit 1 is disclosed. It is understood that any of the three memory circuits will be utilized in accordance with the availability of such circuits in response to the extension of connections to the concentrator substations. The selection of one of the memory circuits for storage of the information respecting a forward-linkage connection is determined by the busy, or idle, condition of the respective relays 4TMB1 through 4TMB3, as disclosed herein in detail. For each memory circuit, a time counter of the type shown in detail in FIG. 10 for counter 1 is utilized.

The information stored in the memory circuit includes the identification of the trunk utilized on the forward-linkage portion of the call (terminating trunk) which is stored in tubes TMT0–TMT9, the identification of the trunk utilized on the call-back portion of the call (the originating trunk) stored in tubes TMO0–TMO9, the concentrator code identification of the calling substation, which is illustratively a three out of eight code to represent the 50 substations connectable to a particular concentrator which is stored in three tubes NGM1–NGM8, and the horizontal group identity (number of the concentrator) as stored in tubes HG0–HG4. In addition, the memory circuit maintains a record of the sequence of operations through tube HF, indicating a partially filled memory in which information respecting the forward linkage has been stored, as well as tubes MI, R, ANS and DS. The energization of tube MI indicates the completion of storage of forward linkage and call-back information in the memory circuit. Tube R is utilized to indicate a ringing condition on the called line, whereas tube ANS represents an answer condition on the called line. Tube DS is energized in conjunction with a disconnection of the called line and the transfer of the line to the trunk utilized for the call-back connection.

The contacts of relays 6CAA0 through 6CAA4 and 6CAB0 through 6CAB4 are utilized as shown in FIG. 3 to selectively connect the identifier 300 between one of the ten trunks utilized for the call-back connection and the other of the ten trunks individual to a concentrator utilized for the forward-linkage connection preparatory to the verification of an intra-concentrator calling connection.

In FIG. 9, a portion of the circuitry utilized in disconnecting the calling customer from the call-back linkage trunk and reconnecting his substation to the terminating, or forward-linkage, trunk is shown. Illustratively, eight number group conductors are utilized for each concentrator. Thus, number group conductors NG10–NG80 represent two of the eight number group conductors NG10, NG20, NG30, NG40, NG50, NG60, NG70, and NG80, extending to each of the 50 remote switching units 203, 205, etc., associated with concentrator 0. Similarly, eight number group conductors NG14 through NG84 extend to each of the 50 remote switching units 206, etc., associated with concentrator 4.

In FIG. 4, a scanning circuit is shown sequentially reading out the information stored in the three memory circuits. A selector 400, including a stepping switch 403, is utilized to sequentially operate relays 4TCOA1 and 4TCOB1 through 4TCOA3 and 4TCOB3. These relays represent the output connector relays for memory circuits 1 and 3 respectively, the output relays for memory circuit 2 not being shown. Switch 403 is advanced in any conventional manner as is shown symbolically by relay 402.

Relays 7TRKA– and 7TRKB– reflect trunk supervisory indications. Thus when both are unoperated, an idle condition exists. If only 7TRKA– is operated and the corresponding relay 7TRKB– is released, the establishment of a connection is in progress. If both relays are operated, a busy condition is indicated. If only 7TRKB– is operated, a disconnect condition exists. The operation of these relays is shown symbolically to preserve clarity.

DETAILED DESCRIPTION OF OPERATION— INTRA-CONCENTRATOR CALL

It will be assumed for purposes of illustration that the customer at substation 201 is initiating a service request call. The switching function in establishing the "dial-tone" portion of the call is conventional and similar to that described in the above-referred-to patents. When the customer receives dial tone, he will illustratively dial the directory number of a substation 202 connected to the same concentrator circuit, i.e., initiate the extension of an intra-concentrator call. In response to the storage of the called directory number, the concentrator control circuit determines the translated concentrator number, also as described in the above-referred-to patent and a path is prepared for coupling the called customer to the calling customer. At this time the horizontal group indication as evidenced by the operation of relay 8HG0 will be effected in a conventional manner.

It will further be assumed that the called substation 202 is unique to hold magnet 8LH00. Under these conditions relay 8HG0 will have been operated by the marker in the conventional manner described in the above-referred-to patent. A portion of the operating path for relay 8HG0 may be traced in FIG. 9 from battery, contacts of relay 14HGC0, cable 900, winding of relay 8HG0 to ground. In response to the operation of relay 8HG0 a path may be traced for operation of relay 14HGC0 from negative battery, contacts of relays 5SS, 14DT, 8HG0, 14HGC0, winding of relay 14HGC0 to ground. Relay 9HGA operates when potential is applied to the winding of relay 8HG0 and to detector 901.

When the marker effects a terminating connection to the called customer by operating an appropriate select magnet and hold magnet, in this case assumed to be select magnet 8LS00 and hold magnet 8LH00, the identity of the trunk utilized in the terminating connection may be established. Subsequent to the operation of the selected crosspoint a particular relay 7TRKA– will be operated. The trunk identity is related to the select magnet identity as disclosed in the Brooks et al. patent. Herein it will be assumed that relay 7TRKA00 is operated. The latter relay is shown as being operated symbolically by switch 701. Thereupon a path may be traced in FIG. 12 from negative battery, contacts of relay 9HGA (previously operated), contacts of relays 7TRKB00, 7TRKA00, 6CCA0, 14G, 12TMT0, winding of relay 12TMT0 to ground. Relay 6CCA0 was previously operated over a path from negative battery, winding of relay 6CCA0, contacts of relays 14HGC0, 14NM, 5SS to ground.

The operation of relay 12TMT0 is indicative of the identification of the trunk utilized in the connection extending to the called customer.

In response to the conventional operation of the marker circuit in releasing the line link frame after the connection has been established and specifically in response to the release of relay 9HGA, a path may be traced in FIG. 4 extending from ground, contacts of relays 5SS, 9HGA, 12TMT0, 4TMB1, 14TFR, windings of relays 4TCIA1 and 4TCIB1 in parallel to negative battery.

At this juncture, a registration is made in the memory circuit indicative of the trunk utilized in the terminating connection. Thus a path may be traced in FIG. 12 from positive battery, resistance 1200, pulsing circuit 1201, contacts of relay 12TMT0, conductor TTI0, contacts of relay 4TCIA1, resistance 1202, gas tube TMT0 to negative battery.

Figure 14:
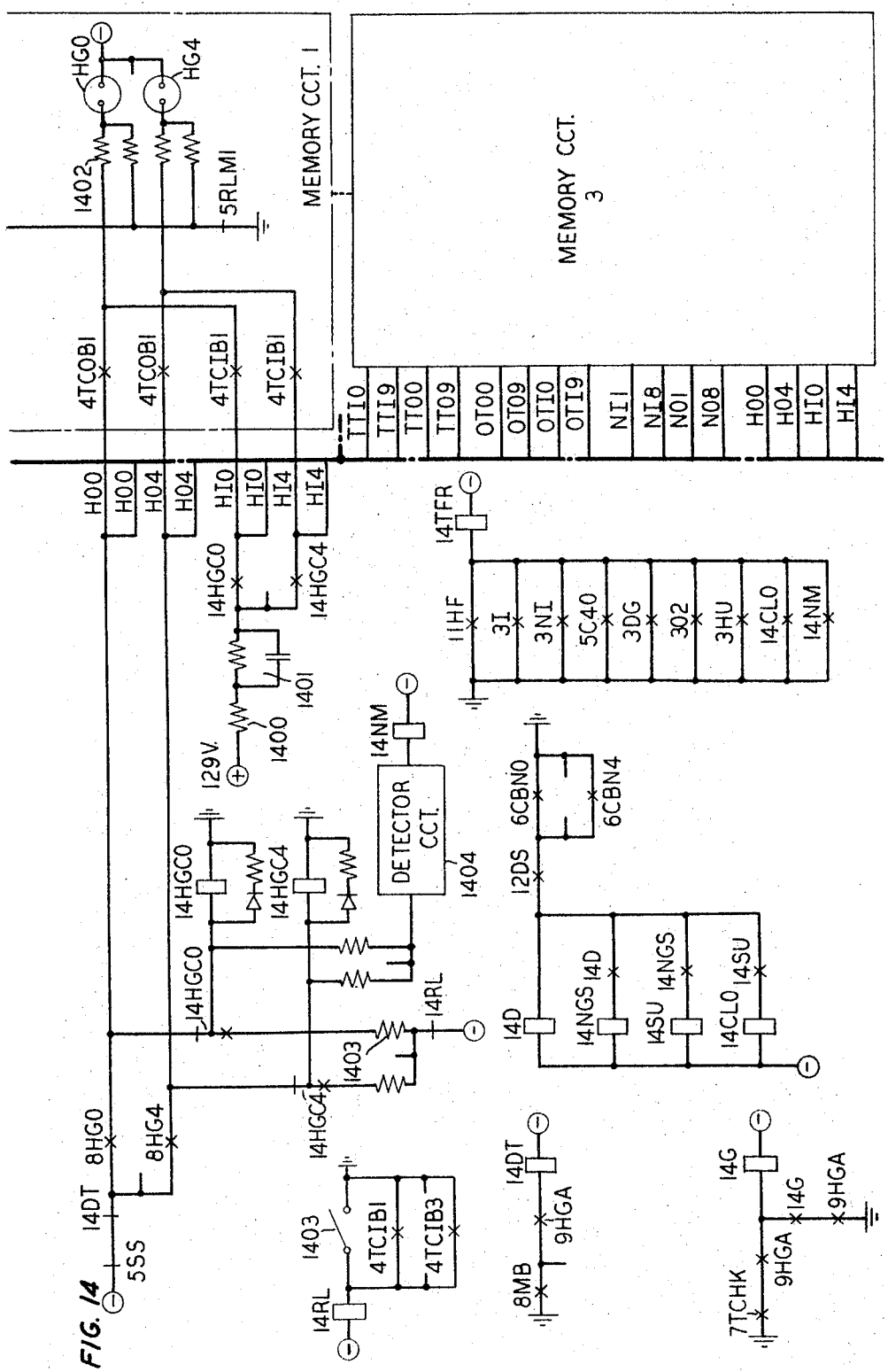

A similar path may be traced for the operation of gas tube HG0 in FIG. 14 from positive battery, resistance 1400, pulsing circuit 1401, contacts of relay 14HGC0, conductor HI0, contacts of relay 4TCIB1, resistance 1402, gas tube HG0 to negative battery.

Thus the operation of tubes TMT0 and HG0 respectively store in memory the identity of the trunk and horizontal group utilized in the terminating connection.

A path may be traced for the operation of relay 14RL over the contacts of relay 4TCIB1 when the latter relay operates. Thereafter, a further path may be traced in FIG. 4 from ground, contacts of relays 14RL, 4TCIB1, 4TMB1, winding of relay 4TMB1 to negative battery. The operation of relay 4TMB1 (and normal relay 4OMB1) is indicative of the partial registration (of the terminating data portion of the call) in the memory circuit and is evidenced by the energization of tube HF. As herein indicated, relay 4OMB– will be operated when the data respecting the originating portion of the call is stored in memory.

In the memory circuit, the operation of relay 10RZ may be traced from negative battery, winding of relay 10RZ, contacts of relays 4TCIB1, 14TFR, 5SS to ground. In operating, relay 10RZ opens the anode circuit of tubes T1–T7 to insure the energization of only tubes T0 and T00. The latter is operated over a path which may be traced in FIG. 10 from negative battery, contacts of relay 4TMB1, resistance 1001, resistance 1002, tube T0, diode 1003 to ground. At this time the circuit is normalized in response to the operation of relay 14RL which releases the remaining relays other than relay 4TMB1.

CALL-BACK PORTION OF INTRA-CONCENTRATOR CALL

Having established the "forward-linkage" or terminating portion of the intra-concentrator connection to the called line appearance and having stored the horizontal group identity and the trunk identification in the memory circuit, the remaining information must now be stored in the partially filled memory circuit.

In essence, the call-back linkage connects a trunk appearance on the trunk link frame and the calling line appearance on the line link frame.

In the course of extending the call-back portion of the connection, a particular relay 8HG– is energized in accordance with the horizontal group on which the calling line appears. Since it has been assumed that an intra-concentrator call is in progress and since the called line (unique to hold magnet 8LH00) appears on horizontal group 0, relay 8HG0 is again operated on the call-back portion of the call. The energization of this relay is detected in FIG. 9 by circuit 901 in parallel with the operating path of relays 8HG0–8HG4. Detector circuit 901 (which may be any suitable voltage responsive circuit) causes the operation of relay 9HGA. The operating path for relay 5SS is interrupted at the contacts of relay 9HGA to prevent a scan cycle from starting.

At this time, relay 14HGC0 operates over a path from negative battery, contacts of relays 5SS, 14DT, 8HG0, 14HGC0, winding of relay 14HGC0 to ground. Relay 14HGC0 locks operated over a path including its own contacts, resistance 1403, contacts of relay 14RL to negative battery. Relays 6CCA0 to 6CCB0 are operated in parallel over a path from ground, contacts of relays 5SS, 14NM, 14HGC0, winding of relays 6CCA0 and 6CCB0 in parallel to negative battery.

Figure 12:
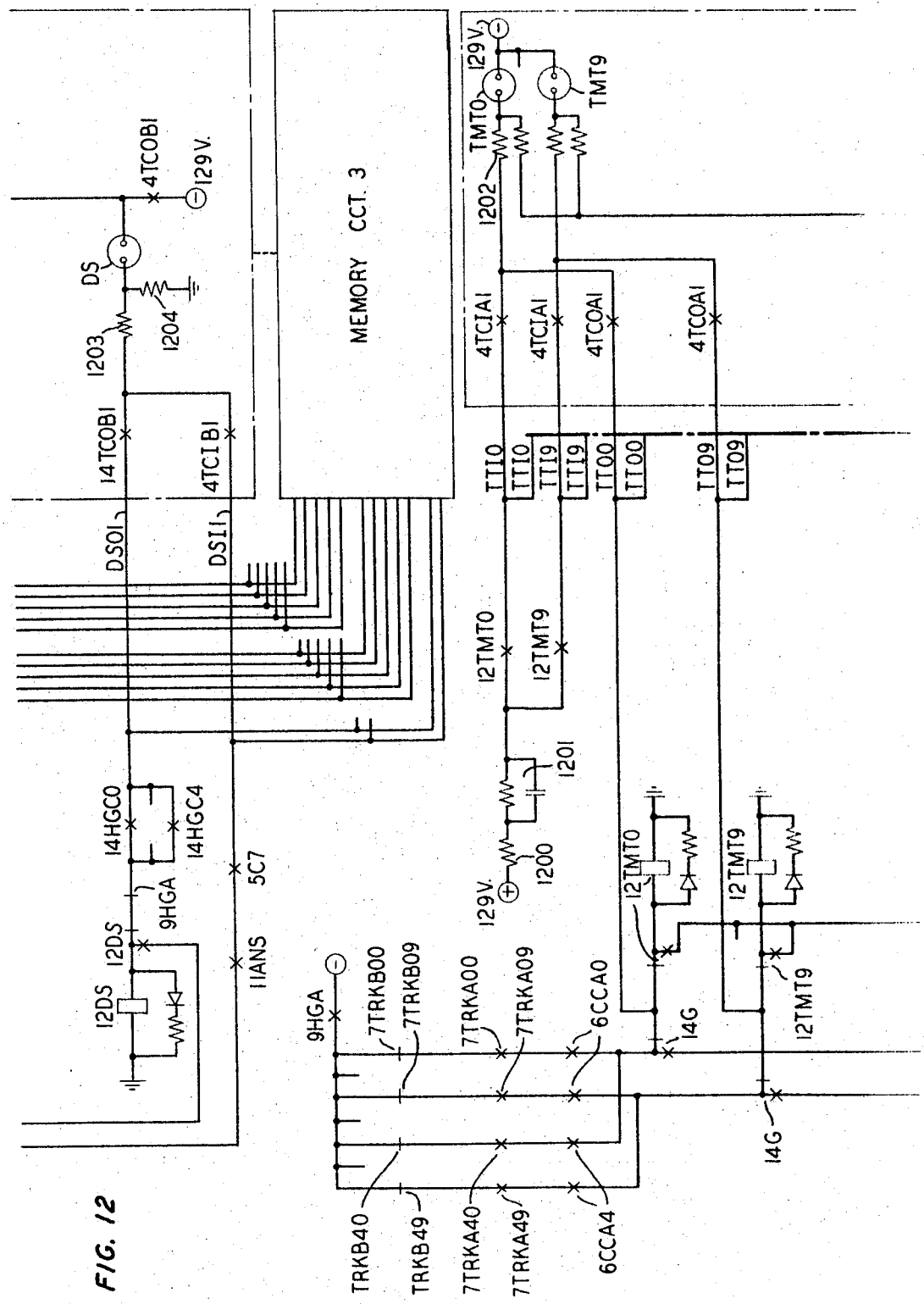
Figure 13:
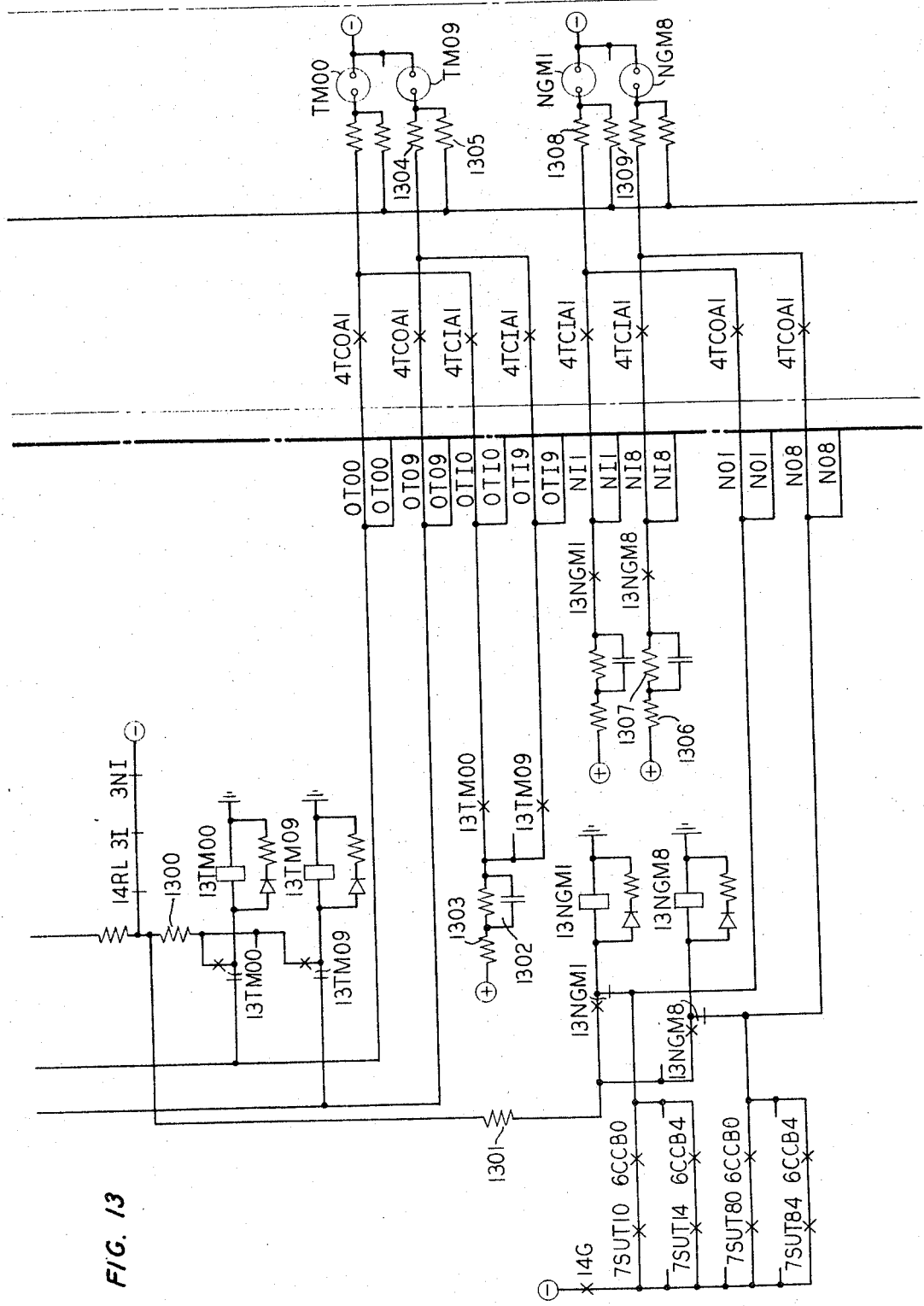

In conventionally completing the call-back portion of the connection, the marker extends a path for the operation of relay 7TCHK, which is shown symbollically by the operation of switch 700. Thus a path may be traced in FIG. 14 from ground, contacts of relays 7TCHK, 9HGA, winding of relay 14G to negative battery. The operation of relay 14G prepares the intra-concentrator circuit for registering the identification of the trunk used in the call-back portion of the call and the number group code in the concentrator of the calling substation. This operation is shown in FIGS. 12 and 13 by the contacts of relay 14G.

It will be assumed for purposes of illustration that the trunk utilized for extending the connection to the originating substation is trunk 09. Thus relay 7TRKA09 is operated, as described in the above-referred-to patent (and shown symbolically by switch 702), and a path may be traced for the operation of relay 13TM09. This path extends from negative battery, contacts of relays 9HGA, 7TRKB09, 7TRKA09, 6CCA0, 14G, 13TM09, winding of relay 13TM09 to ground. The latter relay locks operated over its own contacts, resistance 1300, contacts of relays 14RL, 3I, 3NI to negative battery.

At this time a registration has been made of the identification of the trunk utilized in the call-back portion of the call. The other essential element of information is the identity of the calling substation. This information is derived from the concentrator control circuit in accordance with the relays 7SUT–, which are operated in the control circuit in accordance with a three out of eight code explained in the above-referred-to Brooks et al. patent. For example, a path may be traced from negative battery, contacts of relays 14G, 7SUT8, 6CCB0, 13NGM1, winding of relay 13NGM1 to ground. An additional pair of relays 13NGM– (13NGM4, 13NGM5) are operated over a similar path in accordance with the remaining operated relays 7SUT–, (7SUT40, 7SUT50) of the concentrator control circuit. Relay 13NGM1 locks operated over its own contacts, resistance 1301, contacts of relays 14RL, 3I, 3NI to negative battery. The remaining relays 13NGM– lock operated over a similar path. At this time, the concentrator number group code or identification of the calling substation line is also registered.

When the marker completes its function in a conventional manner and the horizontal group relay in the line link frame is de-energized, relay 9HGA releases when detector circuit 901 responds to the de-energization of 8HG0. Release of relay 9HGA completes a path for the operation of relays 4TCIA1 and 4TCIB1 through 4TCIA3 and 4TCIB3 for those memory circuits which have already stored information respecting a terminating portion of the call. This path may be traced in the case of relays 4TCIA1 and 4TCIB1 from ground, contacts of relays 5SS, 9HGA, 13TM09, 13NGM1 and 13NGM– in parallel 4TMB1, 4OMB1, 14TFR, winding of relays 4TCIA1 and 14CIB1 in parallel to negative battery.

Operation of relay 4TCIA1 connects pulsing circuit 1302 over a path from positive battery, resistance 1303, pulsing circuit 1302, contacts of relay 13TM09, conductor OT19, contacts of relay 4TCIA1, resistance 1304, tube TMO9 to negative battery. Gas tube TMO9 is fired over this path and receives a sustaining potential from ground, contacts of relay 5RLM1 and resistance 1305. At this time, information respecting the identity (trunk 9) of the trunk utilized in the call-back portion of the call is stored in the gas tube memory circuit. The storage of the information respecting the calling line identity is effected over a path from positive battery, resistor 1306, pulsing circuit 1307, contacts of relay 13NGM8, conductor NI8, contacts of relay 4TCIA1, resistance 1308, tube NGM8 to negative battery. Tube NGM8 is sustained in operation over resistance 1309, contacts of relay 5RLM1 to ground. Similar paths for the energization of gas tubes NGM– may be traced over the contacts of the additional two relays 13NGM–.

It will be appreciated that the storage of the calling customer concentrator code identification and the call-back trunk identification are common to similarly numbered elements in each of the five horizontal groups (and five related concentrators). Consequently, to complete a unique storage of the identification, the specific horizontal group on which the calling line and call-back trunk appear must be recorded in the memory circuit. This procedure is effected over a path from positive battery, resistance 1400, pulser 1401, contacts of relay 14HGC0, conductor HI0, contacts of relay 4TCIB1, resistance 1402, tube HG0 to negative battery. Ordinarily, tube HG0 would be fired at this time. However, since the tube was previously energized on the terminating portion of the call, it simply remains ionized. At this time, relay 10RZ is operated over a path from ground, contacts of relays 5SS, 14TFR, 4TCIB1, winding of relay 10RZ to negative battery. As indicated above with respect to the terminating portion of the intra-concentrator call, the operation of relay 10RZ results in a reset to zero of the counting circuit and the energization of tubes T0 and T00.

At this time, relay 40MB1 is operated over a path from ground, contacts of relays 5SS, 9HGA, 13TM09, 13NGM– (in parallel), 4TCIB1, 40MB1, winding of relay 40MB1 to negative battery. Relay 40MB1 locks operated over its own contacts and the contacts of relay 5RLM1. It will be understood that additional relays 40MB– will be operated in accordance with the number of memories which have previously stored terminating information. At this time, a path may be traced for energization of tube MI (FIG. 11) from positive battery, resistance 1100, pulser 1101, contacts of relay 14RL, 5SS, 40MB1, conductor MII1, contacts of relay 4TCIA1, resistance 1102, tube MI, resistance 1103, contacts of relay 4TMB1 to negative battery. Tube MI remains sustained over resistance 1104. In view of the common cathode resistor 1103, tube HF (previously energized over the contacts of relays 40MB1 and 4TMB1) is extinguished.

Relay 14RL operates over the contacts of relay 4TCIB1 and normalizes the circuit in view of the contacts of relay 14RL in series with the hold path of the operated relays. At this time, the memory circuit has stored information respecting the originating trunk identification (trunk 09), the terminating trunk identification (trunk 00), the horizontal group identification (group 0) and the concentrator number group code uniquely identifying the calling substation e.g., 4, 5 and 8 (for a three out of eight code). Moreover, tube MI is also energized in the memory circuit.

SCANNING OF MEMORY CIRCUITS

At this point with information stored in memory circuit 1, a scanning procedure is initiated. Referring to FIG. 5 a 750 millisecond timer 500 causes the operation of relay 5ES if a memory circuit is occupied over a path including the contacts of relays 4TMB1, 5ES, winding of relay 5ES to negative battery. Relay 5ES locks operated over its own contacts to contacts of relay 5ESR. Following the operation of relay 5ES, relay 5SS is operated over a path from ground, contacts of relays 5ES, 9HGA, 14HGC0 through 14HGC4, 5SS, 14RL, 4NTMB, winding of relay 5SS to battery. It will be noted that relays 0HGA and 14HGC0 through 14HGC4 would have been operated if the marker were engaged in effecting a connection to horizontal groups HG0–HG4, thus preventing the operation of relay 5SS.

Figure 11:
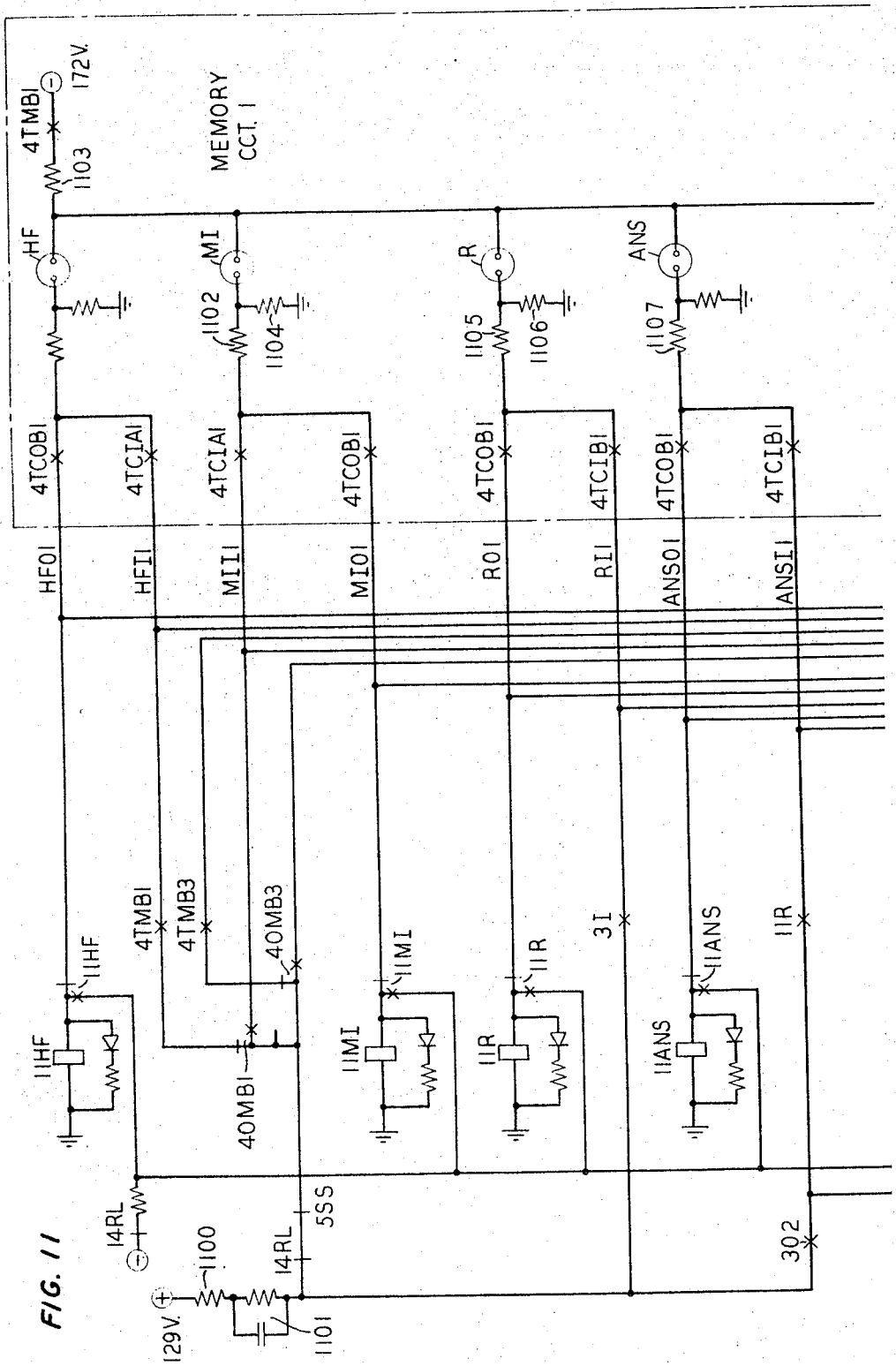

However, assuming the marker is not thus occupied and that relays 9HGA and 14HGC0 are released, the operation of relay 5SS initiates the functioning of selector circuit 400 via relay 402. The selector circuit in turn energizes memory connector output relays 4TCOA1, 4TCOB1 in parallel over a path which may be traced from ground in selector circuit 400, contacts of relay 5SS, detector 401 (which may be any suitable voltage responsive circuit), contacts of relay 4TMB1, 14TFR, winding of relays 4TCOA1 and 4TCOB1 in parallel, contacts of relays 11ANS, 11R, 11MI, 11HF, 12DS to negative battery. As shown in FIGS. 13 and 14 the contacts of relays 4TCOA1 and 4TCOB1 extend a path in the case of tube HG0 from negative battery, tube HG0, resistance 1402, contacts of relay 4TCOB1, conductor HO9, contacts of relay 14HGC0, winding of relay 14HGC0 to ground. The latter relay locks operated over its own contacts, resistance 1403, contacts of relay 14RL to negative battery. It will be noted that relay 14HGC0 is the same relay which, upon its previous operation, effected the actuation of tube HG0 via pulser 1401. A similar path may be traced for the actuation of relays 13NGM1 and 13NGM– over the contacts of relays 4TCOA1. Moreover, relay 13TM09 is also operated over a similar path including the contacts of relay 4TCOA1 and tube TM09. Also a path may be traced for the operation of relay 12TMT0 via the contacts of relay 4TCOA1 and tube TMT0. In FIG. 11 relay 11MI is operated over the contacts of relay 4TCOB1 and tube MI.

Thus, the entire information stored in memory tube circuit 1 has been redelivered to the relays.

Previously (in response to the operation of relay 4TCOB1) it has been established that the trunks utilized are within the same horizontal group as indicated by the failure of relay 14NM to operate in response to detector circuit 1404. The latter is a summing circuit which detects the energization of more than one relay 14HGC–.

The operation of relay 11MI results in the release of relay 4TCOA1 over an abvious path.

In view of the operation of relay 14HGC0 previously indicated, a path may be traced in FIG. 6 for the operation of relays 6CAA0 and 6CAB0 in parallel from ground, contacts of relays 11MI, 14NM, 14HGC0, windings of relays 6CAA0, 6CAB0 in parallel to negative battery.

At this time a path is prepared for the transmission of identifying coded pulses from identifier 300, contacts of relays 11MI, 13TM09, 6CAA0, tip conductor of trunk 09, ring conductor of trunk 09, contacts of relay 6CAB0, contacts of relays 13TM09, 11MI, to identifier 300.

The contacts of relay 11MI also prepare a signal return path over the terminating trunk circuit which may be traced from identifier 300, contacts of relays 12-TMT0, 6CAA0, tip conductor of trunk 00, ring conductor of trunk 00, contacts of relays 6CAB0, 13TM00, 11MI to identifier 300.

Relays 6CBT0 and 6CBR0 are operated at this time over a path from ground, contacts of relays 11ANS, 3I, 3NI, 14RL, 11R, 6CAB0, windings of relays 6CBT0 and 6CBR0 in parallel to negative battery.

Contacts of relays 6CBT0 and 6CBR0 open the path extending to the distant remote units on trunks 00 and 09.

Subsequently, coded pulses are applied over the path previously traced to the tip and ring conductors of trunk 09 (originating trunk) and synchronously, the detector circuit that is connected to the tip and ring conductors of trunk 00 (terminating trunk), is enabled. The signal and detection equipment may, for example, be similar to that shown in the Brooks et al. patent above referred to.

If an intraconcentrator call is in effect between the forward linkage and call-back trunks 00 and 09, the coded pulses will be detected in the detector circuit connected to the trunk utilized on the forward linkage portion of the cinnection and relay 3I will be operated. If the detector fails to detect the coded pulse, relay 3NI will be operated.

The operation of relay 3I as shown symbolically by switch 303 causes a release of relays 13TMO9, 12TMT0 and 13NGM– as shown in FIG. 13. Moreover, the contacts of relay 3I cause the release of relays 6CBT0 and 6CBR0 to reclose the path extending over the trunks to the remote substations.

In FIG. 14 relay 14TFR is operated over an obvious path including the contacts of relay 3I. Thereafter a path may be traced in FIG. 4 from the selector circuit, contacts of relay 5SS, detector 401, contacts of relays 4TMB1, 14TFR, windings of relays 4TCIA1, and 4TCIB1 in parallel to negative battery.

When relay 4TCIB1 is operated, a path may be traced for energization of tube R in FIG. 11 from positive battery, resistance 1100, pulser 1101, contacts of relay 3I, conductor RI1, contacts of relay 4TCIB1, resistance 1105, tube R, resistance 1103, contact of relay 4TMB1 to negative battery. Tube R is sustained in operation over resistance 1106 and tube MI is extinguished.

Moreover, a path may be traced in FIG. 14 from positive battery, resistance 1400, pulser 1401, contacts of relays 14HGC0, conductor HI0, contacts of relay 4TCIB1, resistance 1402, tube HG0 to negative battery. However, tube HG0 has remained operated over the path traced above and this pulse has no effect at this time. The operation of relay 4TCIB1 causes the operation of relay 14RL over an obvious path and the latter relay in turn causes the release of the previously operated relays in the manner described above.

The operation of relay 4TCIB1 also completes a path in FIG. 10 for firing tube TT1 which may be traced from ground, contacts of relays 5SS, 4TCIB1, capacitor 1006, tube TT1, resistance 1001, contact of relay 4TMB1 to negative battery. The energization of tube TT1 delivers a pulse to advance the counting circuit from tube T0 energized to tube T1 energized.

Thereafter timer 500 in FIG. 5 initiates the operation of relay 5ES in the manner described above in turn causing the operation of relay 5SS also as described above. Moreover, selector circuit 400 is energized to operate relays 4TCOA1 and 4TCOB1 as described. (The subsequent memory circuits 2 and 3 are assumed to be inactive and relay 5ESR prevents scanning thereof. Relay 4NTMB provides similar selective scanning when only higher numbered memory circuits are active.)

At this time the information stored in memory is again read out as described above with the exception that relay 11R will be operated instead of relay 11MI. Subsequently, relays 6CAA0 and 6CAB0 are operated over the contacts of relays 11R and 14HGC0. The latter in conjunction with the relays operated from the output of the memory circuit complete a path from detector circuit 301, contacts of relays 11R, 12TMT0, 6CAA0 to the tip conductor of trunk 00 utilized on the forward linkage portion of the call. If a ringing condition exists on the trunk and the ground appears on the tip conductor, relay 3DG will be operated; if an answer condition exists on the trunk, relay 302 will be operated and if a hang-up condition exists, relay 3HU will be operated as shown symbolically by switches 307, 306 and 305, respectively.

The circuit will continue to operate in this manner including repeated readouts of the memory circuit until relay 302 is operated indicating an answer condition or until a maximum of 30 seconds have elapsed and relay 5C40 has operated. Thereupon (in response to an answer condition) relay 10RZ is operated over the contacts of relays 302, 11R and 4TCIB1 and tube ANS is energized over pulser circuit 1101, contacts of relays 302, 11R, conductor ANSI1, contacts of relay 4TCIB1, resistance 1107, tube ANS, resistance 1103, contacts of relay 4TMB1 to negative battery. Tube R is extinguished when tube ANS is energized.

When the timing circuit has advanced to the seventh position (five-second interval), a path may be traced for energization of relay 5C7 in FIG. 5 from ground, winding of relay 5C7, contacts of relay 5C7, resistance 501, contacts of relay 4TCOB1, tube T7, diode 1000, contacts of relay 4TCOB1 to negative battery. Subsequently, after the five-second interval has elapsed a path may be traced in FIG. 11 from pulser 1101, contacts of relays 302, 11ANS, 5C7, conductor DSI1, contacts of relay 4TCIB1, resistance 1203, tube DS, resistance 1103, contacts of relay 4TMB1 to negative battery, thus firing tube DS. Tube DS is sustained over resistance 1204 and extinguishes tube ANS. On the following scan cycle, relay 12DS is energized over the contacts of relay 4TCOB1 (as well as the remaining relays 12TMT9, 13TMO9, etc).

A path may be traced at this time for the operation of relays 6CAA0, 6CAB0, 6CCA0 and 6CCB0 over the contacts of relays 12DS, 14NM and 14HGC0. Moreover, relays 6CBT0, 6CBR0, 6CBS0 and 6CBN0 are operated over the contacts of relay 6CAB0. Relays 9AT4, 9AT5, 9AT8 are also operated over the contacts of relays 12DS, 13NGM4, 13NGM5 and 13NGM8. Relay 7BC00 is operated over the contacts of relay 6CCB0 and cable 904, in order to prevent the operation of the gas tube translator in the concentrator control circuit. At this time, a path may be traced in FIG. 9 from negative battery, contacts of relays 12DS, 14TFR, 12TMT0, 6CCA0, conductor LS00, cable 905, winding of select magnet 8LS00 to negative battery, thus energizing select magnet 8LS00.

RECONNECTION OF CALLING LINE TO FORWARD LINKAGE TRUNK

A path may be traced for the operation of relay 14D from ground, contacts of relays 6CBN0, 12DS, winding of relay 14D to negative battery. In FIG. 3 a path extends from positive battery, contacts of relays 14NGS, 14D, 13TM09, 6CAA0, tip conductor of trunk 09. Moreover, the number group conductors in FIG. 9 are all connected to +70 volt potential over the contacts of relay 6CBN0. As described in the above-referred-to Brooks et al. patent, this combination of potentials results in the release of the substation priorly connected to trunk 09.

Subsequent operations relate to the release of the line vertical of the originating customer and the reconnection of the originating customer line to the trunk used on the forward linkage portion of the call. The line vertical of the originating customer is reoperated to close crosspoints on the level to which the terminating customer is connected. The required select magnet was operated priorly as described above.

RELEASE OF LINE HOLD MAGNET

Previously, the hold magnet 8LH49 for the calling customer substation was held operated over a path from negative battery, winding of relay 8LH49, crosspoint contacts of switch LSW0, horizontal multiple of switch LSW0, sleeve conductor S09, cable 801, contacts of relay 6CBS0, conductor S09, cable 297, contacts of relays 7TRKB09, 7TRKA09, resistance 701 to ground. When relay 6CBS0 was operated as described above, the hold path for hold magnet 8LH49 is interrupted, whereas the hold paths for other hold magnets in the same horizontal group are transferred over the contacts of the respective relays 6CBS0, 13TM0– and 6CAA0.

At this time, a path may be traced for the operation of relay 14NGS from ground, contacts of relays 6CBN0, 12DS, 14D, winding of relay 14NGS to negative battery. The operation of relay 14NGS disconnects positive 165 volt potential (in FIG. 3) from the tip conductor of trunk 09. Moreover, as shown in FIG. 9, the operation of relay 14NGS results in the application of a positive 70 volt potential to those number group conductors which uniquely characterize the calling customer station, whereas a negative 48 volt potential is applied to the remaining number group conductors over the contacts of relays 13NGM– and 14NGS. Relays 6CDA0 and 6CDB0 are operated over a path from ground, contacts of relays 14NGS, 6CCB0, windings of relays 6CDA0 and 6CDB0 in parallel to negative battery. At this time, a path is completed (in FIG. 9) from positive 130 volt potential at capacitor 902, contacts of relays 14NGS, 9AT4, 9AT5, 9AT8, 6CDB0, conductor LH49, cable 906, winding of relay 8LH49 to negative battery. When capacitor 902 is sufficiently discharged, diode 903 provides a hold path for the hold magnet. It will be noted that hold magnet 8LH49 once operated, will lock over its own crosspoint contacts to the sleeve ground which is maintaining hold magnet 8LH00 operated.

Moreover, relay 14SU is operated from ground, contacts of relays 6CBN0, 12DS, 14NGS, winding of relay 14SU to negative battery.

When relay 14SU operates, a further path may be traced from −167 volt potential in FIG. 3), contacts of relays 14CL0, 14SU, 12TMT0, 6CAA0 to the tip conductor of trunk 00, the terminating trunk.

The combination of the negative potential on the tip conductor and the positive 70 volt potentials on the three selected number group conductors results in the energization of the remote unit unique to substation 49, as described in the above-referred-to patent.

Relay 14CL0 is operated over the contacts of relays 14SU, 12DS, 6CBN0 to ground. The operation of relay 14CL0 removes negative potential from the tip conductor and causes the operation of relay 2CS00 over a path in FIG. 3 from ground, contacts of relays 14CL0, 12TMT0, 6CCB0, winding of relay 2CS00 to negative battery. Operation of relay 2CS00 divorces the concentrator trunk from the office trunk circuit and provides talking battery for the connection. Relay 14TFR is operated over the contacts of relay 14CL0. Relays 4TCIA1 and 4TCIB1 are operated over the contacts of relays 14TFR and and 4TMB1, detector 401, contacts of relay 5SS to ground in the selector 400. The operation of relay 4TCIB1 results in the operation of 5RLM1 over a path including the contacts of relays 4TCIB1 and 14CL0. The operation of TCIB1 also operates relay 14RL over an obvious path. Operation of relays 14RL and 5RLM1 normalize (cause the release of) the relays in the circuit and the tubes are extinguished.

DETAILED DESCRIPTION OF OPERATION—DIAL TONE CALL

As shown herein, the memory circuit is prevented from being actuated in respect to the seizure of a line link frame during the course of a dial tone connection, i.e., the connection of an originating or dial pulse register to a calling customer. Thus, when a customer initiates a call by going off-hook, the concentrator functions in establishing a connection to the central office are similar to those described in the above-referred-to patent of C. E. Brooks et al. Thereafter, the extension of a connection to a dial pulse register is similar to that described in the above-referred-to Busch patent. As shown in FIG. 14, relay 14DT is operated over the contacts of relays 9HGA and 8MB. Relay 9HGA is operated in response to the application of potential to the winding of the respective relay 8HG–. Assuming that the calling line is in horizontal group 0, relay 8HG0, will be operated in the manner described above for an intraconcentrator call. Relay 8MB is shown as being symbolically operated by switch 800 and is, in fact, a relay in the line link connector circuit which operates when the marker seizes the respective line link frame.

The operation of relay 14DT prevents the operation of relay 14HGC0, despite the operation of relay 8HG0 as shown in FIG. 14. Since relay 14HGC0 cannot operate, the connector relays 6CCA0 and 6CCB0 are prevented from operating, as shown in FIG. 6. Thereupon, the memory relays 12TMT– and 13TM– are prevented from operating, in view of the contacts of relay 6CCA0 in series therewith.

Relays 13NGM– are prevented from operating in view of the contacts of relay 6CCB0 in series therewith, and relay 14HGC0 is prevented from operating as described above by the contacts of relay 14DT in series therewith. In consequence, no information is stored in the memory circuit on a dial tone connection.

DETAILED DESCRIPTION OF OPERATION— OUTGOING CALL TO DISTANT OFFICE

Under these conditions, it will be assumed that a customer is initiating a call to a distant office. The dial tone connection to an originating register and the prevention of storage in the memory of information respecting the dial tone connection is similar to that described above. In this instance, when the marker determines that the exchange code represents another office, information is delivered to the sender respecting the called directory number and the connection is extended to the terminating office in a conventional manner. Thereafter, the local marker proceeds to establish a call-back connection between the outgoing trunk extending to the called office and the calling customer termination. Here again, the horizontal group relay 8HG0 (assuming that the calling customer is in horizontal group 0) is activated. Thereafter, the storage of information in the relays is similar to that described above for an intra-concentrator call. Thus, if the trunk utilized in the call-back portion of the call is trunk 0, relay 13TM00 will be operated over the path described above. Moreover, relays 13NGM– will be operated to store the concentrator code identification of the originating customer also in the manner described above and relay 14HGC0 is operated to record the horizontal group in which the calling line appears. However, relays 4TCIA1 and 4TCIB1 are prevented from operating in view of the open contacts of relay 4TMB1 in series therewith. Although relays 13NGM– and 13TMO– representing the concentrator code number and trunk identification are operated, the path remains incomplete in view of the contacts of relay 4TMB1 in series therewith. As indicated above, this condition of relays 4TMB1 released and 4OMB1 released indicates a previously "empty" memory. The same analysis applies to the remaining memory connector relays of which only relays 4TCIA3 and 4TCIB3 are shown.

In view of the contacts of relays 4TCIA1 and 4TCIB1 in series therewith, tubes TM0–, NGM– and HG– are prevented from operating. The operated relays 13TM0–, 13NGM, and 14HGC0 may be illustratively released using symbolic manual switch 1403.

DETAILED DESCRIPTION OF INTRA-OFFICE CALL TO A DIRECT LINE CUSTOMER

Assuming that a concentrator customer initiates a call to a direct line customer or to a concentrator customer connected to a different line link frame or to a horizontal group not served by the three memory circuits described herein, no storage will be effected in the memory circuit with respect to the forward linkage portion of the call. This follows since relay 8HG– will not be operated during the forward linkage portion of the call. Moreover, although the respective relay 8HG– will be operated during the call-back portion of the call, no storage will be effected in the memory tubes for reasons identical to those described immediately above.

DETAILED DESCRIPTION OF INTRA-OFFICE CALL BETWEEN CONCENTRATOR CUSTOMERS CONNECTED TO DIFFERENT HORIZONTAL GROUPS

Under these conditions, the forward linkage portion of the call and the call-back portion of the call are both stored in memory in a manner identical to that described above for a legitimate intra-concentrator call. The action proceeds until the horizontal group check is effected. As indicated in part above, when the information is read out of memory, a relay 14HGC– will be operated in accordance with the previously operated associated tube. If, for example, tubes HG0 and HG4 are both operated, relays 14HGC0 and 14HGC4 will be energized, in turn causing the operation of relay 14NM over detector 1404.

Operation of relay 14NM causes the operation of relay 14TFR which, in turn, effects the operation of connector input relays 4TCIA1 and 4TCIB1 in the manner described above. Operation of relay 4TCIB1 causes the operation of relay 5RLM1 over the contacts of relay 14NM. The operation of relay 5RLM1 effects a release of the memory circuit tubes. Relay 4TMB1 and 4OMB1 are similarly released to indicate that the memory circuit is idle. Relay 14RL is operated at the contacts of relay 4TCIB1 to normalize the circuit.

INCOMING CALL TO CONCENTRATOR CUSTOMER FROM DISTANT OFFICE

The procedure in response to an incoming call is initially, similar to that for a terminating (forward-linkage) call described above. Information respecting the forward-linkage trunk and horizontal group are stored in the memory tubes. Thereupon scanning is initiated and during the second scan, when tube T1 is activated, relay 5C1 is energized (after at least, 750 milliseconds).

Thereupon a path may be traced in FIG. 5 from ground contacts of relays 11HF, 5C1, 4TCIB1, winding of relay 5RLM1 to ground. The combinational logic of relays 5C1 and 11HF collectively indicate that a "half full" (no call-back information) memory still exists after 750 milliseconds. In consequence, it is anticipated that no related call-back call will be made, since the marker would conventionally operate within this period.

The operation relay 5RLM1 extinguishes the memory tubes.

It will be noted that under appropriate conditions in No. 5 crossbar operations, it is possible to decisively conclude that an intra-concentrator call exists without the necessity of applying a coded signal to one of the trunks and detecting on the other.

Thus, assuming only a single marker serves the office (or that other markers are appropriately locked out from the subject line link frame of FIG. 8) the storage of information respecting a call-back call within a predetermined period following a terminating call must reflect a true intra-concentrator call since the marker will complete the forward-linkage and call-back linkage prior to being released for other requests. Thus, when the information reflecting the call-back and forward-linkage calls are stored in memory, arrangements may be made to reconnect both customers to one trunk—bypassing the coded signal procedure. This manner of operation may be initiated by actuation of switch 303 to operate relay 3I. The procedure thereafter is similar to that described above.

It is to be understood that the above-described arrangements are illustrative of the application of the principles of the invention. Numerous other arrangements may be devised by those skilled in the art without departing from the spirit and scope of the invention.

What is claimed is:

1. A telephone line concentrator system including a central office, a plurality of trunks connected to said office, a greater plurality of substations, remote switching means for connecting said trunks to said substations under control of said office, memory means in said office responsive to the extension of separate connections between said office and two of said substations over two of said trunks for recording the identity of said trunks, and means for detecting the existence of an intra-concentrator calling connection including means for applying a marking signal to one of said trunks identified in said memory means and for detecting the application of said signal on only the other of said trunks identified in said memory means.

2. A telephone line concentrator system including a telephone central office, a plurality of remote substations, a smaller plurality of trunks extending from said office, remote switching means for coupling said lines to said trunks under control of said office, memory means in said office for registering the identity of two of said trunks utilized to extend connections from said office to two of said substations, additional means at said office for determining the existence of an intra-concentrator calling connection including means for applying a coded signal to a first of said trunks registered in said memory means and examining the other of said trunks registered in said memory means for the presence of said signal, and means effective in response to the presence of said signal on said other of said trunks for releasing said first trunk and connecting both substations to said other trunk.

3. A telephone line concentrator system including a telephone central office, a plurality of substation lines remote from said office, a smaller plurality of trunks extending from said office, remote switching means for coupling said lines to said trunks under control of said office, and memory means in said office effective in response to the extension of a terminating connection to one of said substations over one of said trunks for storing the identity of said trunk preparatory to determining the existence of an intra-concentrator calling connection.

4. A telephone line concentrator system in accordance with claim 3 including in addition means in said memory circuit effective in response to the extension of a call-back connection to a calling one of said substations over a selected one of said trunks for storing the identity of said selected call-back trunk and for storing the identity of said calling substation.

5. A telephone line concentrator system in accordance with claim 3, wherein said means for storing said trunk identity includes gas tube storage means.

6. A telephone line concentrator system in accordance with claim 3, including in addition means responsive to the lapse of predetermined time interval prior to the extension of a call-back connection to a calling one of said substations for erasing said information stored in said memory circuit.

7. A telephone central office, a plurality of remote switching units, a plurality of groups of remote substations connected to said units, groups of trunks individually coupling said units to said office, means in said office for governing each of said units to extend connections to the respective substations over a selected trunk in said group serving said remote unit to which said substations are connected, and a plurality of memory circuits at said office fewer in number than said units for registering the identities of said trunks selected for extending connections to said substations preparatory to determination of the existence of an intra-concentrator calling connection.

8. A telephone central office in accordance with claim 7 including in addition means in said memory means for storing the identity of the particular remote unit to which said selected trunks extend, and additional means responsive to the storage in said memory circuit of the identity of more than one remote unit for erasing said memory circuit.

9. A telephone central office in accordance with claim 8, including means effective when a single remote unit identity is stored in said memory circuit for determining the establishment of an intra-concentrator calling connection including means for applying a marking signal to a first one of said trunks and for examining for the presence of said signal only on said other trunk as registered in said memory circuit.

10. A telephone central office in accordance with claim 9, including means effective in response to the presence of said marking signal on said other trunk for disestablishing said connection between said first trunk and said substation connected thereto and for reconnecting both of said substations to said other trunk.

11. A telephone line concentrator system including a telephone central office, a plurality of remote substation lines, a lesser plurality of trunks extending from said office, remote switching means for coupling said lines to said trunks under control of said office, memory means in said office effective in response to the extension of a terminating connection to a called one of said lines for recording said trunk over which said terminating connection is extended, additional memory means for storing the identity of said trunks over which connections to calling substations are effected, dial pulse register means in said office, and means for precluding the operation of said memory means in response to the extension of a connection from a calling substation to said dial pulse register means.

12. An intra-concentrator detector circuit for use in combination with a telephone line concentrator system comprising memory means for storing the identity of trunks utilized in extending terminating connections to called ones of said substations and for subsequently storing the identities of connections extended over said concentrator to calling ones of said substations, and means connectable to said memory means for precluding storage in said memory means of said trunk identities in response to the extension of connections to calling ones of said substations without prior storage of the identities of trunks extending to called one of said substations.

13. A telephone concentrator switching system including a plurality of remote telephone lines, a telephone central office, a plurality of remote switching units individual to and proximate to said lines, a plurality of trunks less in number than said lines for coupling said remote switching units to said office, memory means in said office for storing information representative of the trunk identity of a connection extending to a called one of said substations, and additional means in said memory means for recording information representative of a connection to a calling substation other than said substations connectable to said plurality of trunks for erasing said trunk identity registration.

14. An intra-concentrator detecting circuit for use in combination with a telephone line concentrator having trunks extending therefrom to a remote switching unit to which a larger plurality of lines are terminated including erasable memory means effective in response to the extension of a connection to a called one of said substations and to a calling one of said substations for storing the trunk identities of said trunks utilized for extending said connections, and means for reading out from said memory means the information stored therein preparatory to the determination of an intra-concentrator connection.

15. An intra-concentrator detecting circuit in accordance with claim 14 wherein said means for reading out includes a plurality of relay devices and wherein said means for storing said trunk identities includes a plurality of gas tubes individually connected to said relay devices.

16. An intra-concentrator call detecting circuit for use in combination with a telephone line concentrator system having a telephone office, a plurality of trunks extending from said office, a larger plurality of lines, and remote switching means for coupling said lines to said trunks under control of said office, characterized by a memory circuit in said office effective in response to the extension of a connection to a called one of said concentrator lines over one of said trunks for storing the identity of said trunk extending to said called line preparatory to verifying the existence of an intraconcentrator calling connection.

17. An intra-concentrator call detecting circuit in accordance with claim 16 including in addition means in said memory circuit for storing the identity of one of said trunks extending from said office to a calling one of said lines.

18. An intra-concentrator call detecting circuit in accordance with claim 17 including means for applying a marking signal to said trunk extending to said calling substation and examining for the presence of said signal only on said trunk extending to said called substation for verifying the existence of an intra-concentrator calling connection.

19. An intra-concentrator circuit in accordance with claim 18 including in addition means effective in response to the presence of said signal on said trunk extending to said called substation for releasing said trunk extending to said calling substation and for reconnecting both said substations to said trunk extending to said called substation.

20. A telephone switching system, including a central office; a plurality of telephone line concentrators, each of said concentrators comprising a plurality of remote substations, a lesser plurality of trunks extending from said office, and remote switching means for connecting said lines to said trunks under control of said office; memory means in said office fewer in number than said concentrators, means in a first of said memory means effective in response to the initiation of a terminating call over a selected trunk to a called one of said substations for storing the identity of said selected trunk and the identity of said concentrator to which said called line is connected, and means in all of said memory means, storing trunk identities effective in response to the subsequent extension of a connection over a different trunk to a calling one of said substations for recording the identity of said different trunk and the identity of said concentrator to which said calling substation is connected.

21. A method for detecting intra-concentrator telephone connections in a telephone concentrator system having a number of trunks extending from a central office to a plurality of remote switching facilities which connect to a larger number of substations including the steps of storing in an erasable memory call data for a connection via one of said trunks to a first one of said substations, storing in said memory call data for a connection to a second one of said substations, and comparing said stored data within a predetermined period of time following the extension of said connection to said first substation for detecting that said first and second substations are connected to the same one of said remote switching facilities preparatory to connecting both said substations to said one trunk.

22. A method for detecting intra-concentrator calls in a concentrator which includes a plurality of trunks extending from a central office to remote concentrator facilities at which a larger plurality of substations are terminated including the steps of storing in an erasable memory the identity of a trunk utilized in extending a connection to a calling one of said substations, storing the identity of a trunk utilized in extending a connection to a called one of said substations, applying a marking signal to one of said trunks stored in said memory, and examining for the presence of said signal only on said other trunk stored in said memory.

23. A method for detecting intra-concentrator calls in accordance with claim 22 including in addition storing the identity of said calling substation in said memory and transferring said calling substation identified in said memory to said other trunk identified in said memory in response to the presence of said marking signal on said other trunk.

24. An intra-concentrator detector circuit for use with a telephone line concentrator system having a plurality of trunks extending from a telephone central office to remote concentrator facilities at which a larger plurality of lines are terminated comprising erasable memory means, means responsive to the extension of a terminating connection to a called one of said lines over a first of said trunks for storing said first trunk identity in said memory means, and additional means responsive to the extension of a connection to a calling one of said lines over a second trunk within a predetermined time interval for indicating the existence of an intra-concentrator connection.

References Cited
UNITED STATES PATENTS

| | | |
|---|---|---|
| 3,250,859 | 5/1966 | Fisher. |
| 3,308,243 | 3/1967 | Roscoe. |
| 3,198,887 | 8/1965 | Brooks et al. |

WILLIAM C. COOPER, Primary Examiner